US012759344B2

(12) United States Patent
Romanov et al.

(10) Patent No.: US 12,759,344 B2
(45) Date of Patent: Oct. 13, 2026

(54) TIP-RESISTANT CASTER ASSEMBLY AND MOBILE APPARATUS, AND METHOD FACILITATING AUTONOMOUS NAVIGATION

(71) Applicant: LABRADOR SYSTEMS, INC., Oak Park, CA (US)

(72) Inventors: Nikolai Romanov, Oak Park, CA (US); Severn Swift, Calabasas, CA (US); Michael Dooley, Pasadena, CA (US); James Phillip Case, Van Nuys, CA (US); Patrick Petrossian, Azusa, CA (US)

(73) Assignee: Labrador Systems, Inc., Oak Park, CA (US)

( * ) Notice: Subject to any disclaimer, the term of this patent is extended or adjusted under 35 U.S.C. 154(b) by 57 days.

(21) Appl. No.: 18/721,084

(22) PCT Filed: Jan. 4, 2023

(86) PCT No.: PCT/US2023/060111
§ 371 (c)(1),
(2) Date: Jun. 17, 2024

(87) PCT Pub. No.: WO2023/133419
PCT Pub. Date: Jul. 13, 2023

(65) Prior Publication Data

US 2025/0050682 A1 Feb. 13, 2025

Related U.S. Application Data

(60) Provisional application No. 63/296,479, filed on Jan. 4, 2022.

(51) Int. Cl.
*H02P 6/04* (2016.01)
*B60B 33/00* (2006.01)

(52) U.S. Cl.
CPC .... *B60B 33/0021* (2013.01); *B60B 2900/551* (2013.01)

(58) Field of Classification Search
CPC .......... B60B 33/0021; B60B 2900/551; B60B 33/0015; B60R 19/54; G05D 1/021; G05D 1/0212; G01C 21/34
See application file for complete search history.

(56) References Cited

U.S. PATENT DOCUMENTS

| | | | |
|---|---|---|---|
| 5,134,753 | A | 8/1992 | Rekuc |
| 6,908,087 | B2 | 6/2005 | Wintersgill et al. |

(Continued)

FOREIGN PATENT DOCUMENTS

| | | | |
|---|---|---|---|
| DE | 2108002 | A1 | 9/1971 |
| JP | 6431626 | B1 | 11/2018 |

OTHER PUBLICATIONS

International Search Report and Written Opinion for International Patent Application No. PCT/US2023/060111, mailed Jul. 28, 2023, 14 pages.

*Primary Examiner* — Muhammad S Islam
(74) *Attorney, Agent, or Firm* — Withrow + Terranova, PLLC; Vincent K. Gustafson

(57) ABSTRACT

A caster assembly for a mobile apparatus (e.g., robot incorporating multiple caster assemblies) includes a hoof member to configured to inhibit tipping of the mobile apparatus. A hoof member or a wheel of a caster assembly may be spring biased to permit a hoof to contact a travel surface on which the wheel is supported responsive to imposition of a downward vertical force on a stem of the assembly. A method of inhibiting tipping of such a mobile apparatus when transiting an area including a travel surface bounded by a ledge is further provided. To reduce shaking or spillage of cargo, (Continued)

transit risk areas may be mapped, and transit speed of a mobile robot may be reduced in or near transit risk areas.

20 Claims, 16 Drawing Sheets

(56) References Cited

U.S. PATENT DOCUMENTS

| | | | |
|---|---|---|---|
| 2020/0225673 | A1* | 7/2020 | Ebrahimi Afrouzi ........................ A47L 11/4011 |
| 2020/0339350 | A1 | 10/2020 | Dooley et al. |
| 2021/0164785 | A1 | 6/2021 | Dooley et al. |
| 2021/0245081 | A1* | 8/2021 | Kumar .................. A47L 9/2847 |

* cited by examiner

TIP-RESISTANT CASTER ASSEMBLY AND MOBILE APPARATUS, AND METHOD FACILITATING AUTONOMOUS NAVIGATION

CROSS-REFERENCE TO RELATED APPLICATION(S)

This application is a 35 U.S.C. § 371 national phase filing of International Application No. PCT/US2023/060111, filed on Jan. 4, 2023, which claims priority to U.S. Provisional Patent Application No. 63/296,479 filed on Jan. 4, 2022, wherein the entire disclosures of the foregoing applications are hereby incorporated by reference herein.

TECHNICAL FIELD

The present invention relates generally to mobile apparatuses (including but not limited to mobile delivery robots, delivery carts, and mobility assistance devices), as well as methods facilitating autonomous navigation of mobile delivery robots in dynamic unstructured environments.

BACKGROUND

A wide variety of Automated Guided Vehicles (AGVs) have been used to automatically transport items within manufacturing and warehouse settings for several decades. These environments are typically structured for use with robots (e.g., by provision of machine-readable landmarks), usually with few dynamic changes in terms of new or unexpected obstacles, and are typically provided with consistent lighting conditions. Over time, versions of these AGVs have been adapted for use in other settings such as hospitals, laboratories, and office environments to carry and deliver items.

Advances in industrial sensors, processors, and software have enabled more autonomous versions of AGVs, sometimes referred to as Self Guided Vehicles or SGVs. SGVs may perform tasks similar to AGVs, but generally can operate with less external structure, and are more adaptable in the routes and delivery roles they support.

Various technological advances for consumer electronics, including 3D cameras, mapping software, gyroscopes, proximity sensors, lithium batteries, wireless communication, low-power high-speed processors, recognition software and artificial intelligence may enable SGVs to be sufficiently cost effective to render them suitable for a broader range of unstructured settings, such as homes, as well as a broader range of uses, such as personal delivery robots.

In certain contexts, mobile delivery robots suitable for residential use may be pushed or leaned on by a user (e.g., for physical support when a user has limited mobility due to arthritis and/or advanced age). A mobile delivery robot for residentially use may incorporate casters along lower peripheral areas (optionally in combination with one or more drive wheels at lower central areas). When forces of various directions are applied by a user, such a robot may be susceptible to tipping, depending on the position and orientation of casters thereof. A mobile delivery robot incorporating casters may also encounter a ledge (e.g., at the top of one or more stairs) and be susceptible to either toppling or becoming stuck if one or more casters transit over the ledge.

In certain contexts, mobile delivery robots suitable for residential use and useful for carrying cargo may encounter various navigable conditions (e.g., transitions between different types of flooring, electrical cords, etc.) that may elevate a risk of shaking (e.g., dislodging) or spillage of cargo. It would be desirable to mitigate this risk without unnecessarily reducing transit time. In other contexts, a mobile delivery robot may encounter one or more areas (e.g., deep pile carpets, variegated floor registers, or the like) that entail higher than normal user effort to move the robot by pushing. If a mobile robot should navigate into such an area and experience a loss of charge, a mobile robot not subject to being manually positioned with ease by a user could potentially block a path within a residential environment.

Despite advances in AGVs and SGVs, the art continues to seek item retrieval and transport robots suitable for use in unstructured human-occupied spaces, including robots that can support manual and/or automated loading and unloading functions, and that address challenges associated with conventional robots.

SUMMARY

Aspects of the present disclosure relate to a caster assembly including a hoof member configured to inhibit tipping of a mobile apparatus (such as a mobile robot) equipped with such a caster assembly (preferably multiple caster assemblies, such as at four corner areas thereof). A mobile apparatus may include a mobile robot such as a robotic item retrieval and transport apparatus suitable for carrying and delivering objects in a home setting and/or other environments. Further aspects of the present disclosure relate to a mobile apparatus equipped with multiple caster assemblies, and a method for inhibiting tipping of such a mobile apparatus when transiting an area including a travel surface bounded by a ledge. Additional aspects of the present disclosure relate to a method for facilitating autonomous navigation by a mobile robot of an unstructured residential environment, including mapping of locations of transit risk areas within the paths over which transit of the mobile robot at a first transit speed would cause an undue risk of shaking or spillage of cargo when borne by the mobile robot, and reducing transit speed of the mobile robot when in or near the transit risk areas. Further aspects of the present disclosure relate to a method for facilitating autonomous navigation by a mobile robot of an unstructured residential environment, including mapping of locations of one or more high transit effort areas within the paths over which manual pushing of the mobile robot would require a user to apply an amount of force exceeding a threshold force, and eliminating utilization by the mobile robot of paths including the one or more high transit effort areas in the absence of a user override of such utilization.

In one aspect, the disclosure relates to a caster assembly comprising: a stem member configured to permit pivotal movement about a vertical axis; a wheel having a horizontal axis of rotation that is laterally offset in a first direction relative to the vertical axis; and a hoof member comprising a body structure and defining a recess that is arranged below the stem member and that receives a portion of the wheel, wherein at least a portion of the hoof member is laterally offset relative to the vertical axis in a second direction that opposes the first direction; wherein during rotation of the wheel, a bottom surface of the hoof member is elevated relative to a bottom of the wheel.

In certain embodiments, the body structure of the hoof member comprises a generally arcuate shape when viewed from above.

In certain embodiments, the body structure of the hoof member spans around at least 180 degrees of a perimeter of the stem member when viewed from above.

In certain embodiments, portion of the body assembly of the hoof member is laterally offset in the second direction from the vertical axis a greater distance than the horizontal axis of rotation is laterally offset in the first direction from the vertical axis.

In certain embodiments, the hoof member is configured to pivot downward upon imposition of a downward vertical force on the stem member, to permit a portion of the hoof member to contact a travel surface on which the wheel is supported.

In certain embodiments, the caster assembly further comprises a pivotal link member arranged between the hoof member and the wheel, wherein the pivotal link member is configured to permit the hoof member to pivot downward around the horizontal axis of the wheel.

In certain embodiments, the pivotal link member is coupled with a spring configured to exert a restoring force to counteract downward pivotal movement of the hoof member.

In certain embodiments, the caster assembly further comprises a drag link member that is pivotally coupled with and arranged to pivot relative to the hoof member, wherein an upper portion of the drag link member is configured to slide relative to a slot defined in a slot-forming member coupled with a support structure for the stem member.

In certain embodiments, a lower portion of the drag link member extends through a cavity defined in the body structure to protrude downward below a lower surface of the hoof member.

In certain embodiments, a bend or directional change is provided between the upper portion of the drag link member and the lower portion of the drag link member In certain embodiments, the caster assembly is configured to cause the lower portion of the drag link and a portion of the hoof member to be in simultaneous contact with the travel surface responsive to imposition of a downward vertical force on the stem member.

In certain embodiments, the hoof member is rigidly affixed to a support structure for the stem member to prevent downward pivotal movement of the hoof member.

In certain embodiments, the wheel is spring biased and is configured to travel or pivot in a generally upward direction upon imposition of a downward vertical force on the stem member, to permit a portion of the hoof member to contact a travel surface on which the wheel is supported.

In another aspect, the disclosure relates to a mobile apparatus comprising a mobile base, and a plurality of caster assemblies as disclosed herein coupled to the mobile base.

In certain embodiments, the mobile base is substantially rectangular with four corner areas, the plurality of caster assemblies comprises four caster assemblies, and each caster assembly is arranged proximate to a respective corner area of the four corner areas.

In certain embodiments, the mobile apparatus further comprises a plurality of powered differential drive wheels positioned distal from the four corner areas and configured to move the mobile base.

In certain embodiments, the mobile apparatus comprises a robotic item retrieval and/or transport apparatus, which comprises an item retrieval mechanism comprising at least one movable implement and configured for lateral transport of the at least one retrievable item between the deck and an extrinsic support surface In another aspect, the disclosure relates to a method for inhibiting tipping of a mobile apparatus including multiple caster assemblies as disclosed herein when transiting an area including a travel surface bounded by a ledge, the method comprising: upon passage of a wheel of at least one caster assembly over the ledge, contacting the travel surface proximate to the ledge with at least a portion of the bottom surface of the at least one caster assembly. In certain embodiments, the method further comprises moving the mobile apparatus to cause the wheel of the at least one caster assembly to re-engage the travel surface.

In another aspect, the disclosure relates to a method for facilitating autonomous navigation by a mobile robot of an unstructured residential environment, the method comprising: identifying a set of desired robot destinations within the unstructured residential environment, identifying paths between at least some desired robot destinations of the set of desired robot destinations; identifying one or more transit risk areas within the paths over which transit of the mobile robot at a first transit speed would cause an undue risk of shaking or spillage of cargo when borne by the mobile robot; mapping locations of the one or more transit risk areas; and responsive to determination that the mobile robot is in or proximate to a mapped location of the one or more transit risk areas, reducing transit speed of the mobile robot to at least one threshold speed below the first transit speed to reduce a risk of shaking or spillage of cargo when borne by the mobile robot.

In certain embodiments, the identifying of one or more transit risk areas is performed by a user.

In certain embodiments, the identifying of one or more transit risk areas is performed by the mobile robot utilizing one or more sensors of the mobile robot.

In certain embodiments, the one or more sensors comprises at least one inertial measurement unit (IMU).

In certain embodiments, the method further comprises automatically determining, by the mobile robot, of the at least one threshold speed below the first transit speed for each transit risk area of the one or more transit risk areas.

In certain embodiments, the method further comprises selectively activating, by a user, whether transit speed of the mobile robot should be reduced to the at least one threshold speed below the first transit speed.

In another aspect, the present disclosure relates to a method for facilitating autonomous navigation by a mobile robot of an unstructured residential environment, the method comprising: identifying a set of desired robot destinations within the unstructured residential environment; identifying paths between at least some desired robot destinations of the set of desired robot destinations; identifying one or more high transit effort areas within the paths over which manual pushing of the mobile robot would require a user to apply an amount of force exceeding a threshold force; mapping locations of the one or more high transit effort areas; and eliminating utilization by the mobile robot of paths including the one or more high transit effort areas in the absence of a user override of such utilization.

In certain embodiments, the identifying of one or more high transit effort areas is performed by a user. In certain embodiments, the identifying of one or more high transit effort areas is performed by the mobile robot by detecting one or more signals indicative of motor torque and/or motor currents applied to differential drive wheels of the mobile robot.

In another aspect, any of the foregoing aspects and/or other features disclosed herein may be combined for additional advantage.

DETAILED DESCRIPTION

Figure 1:
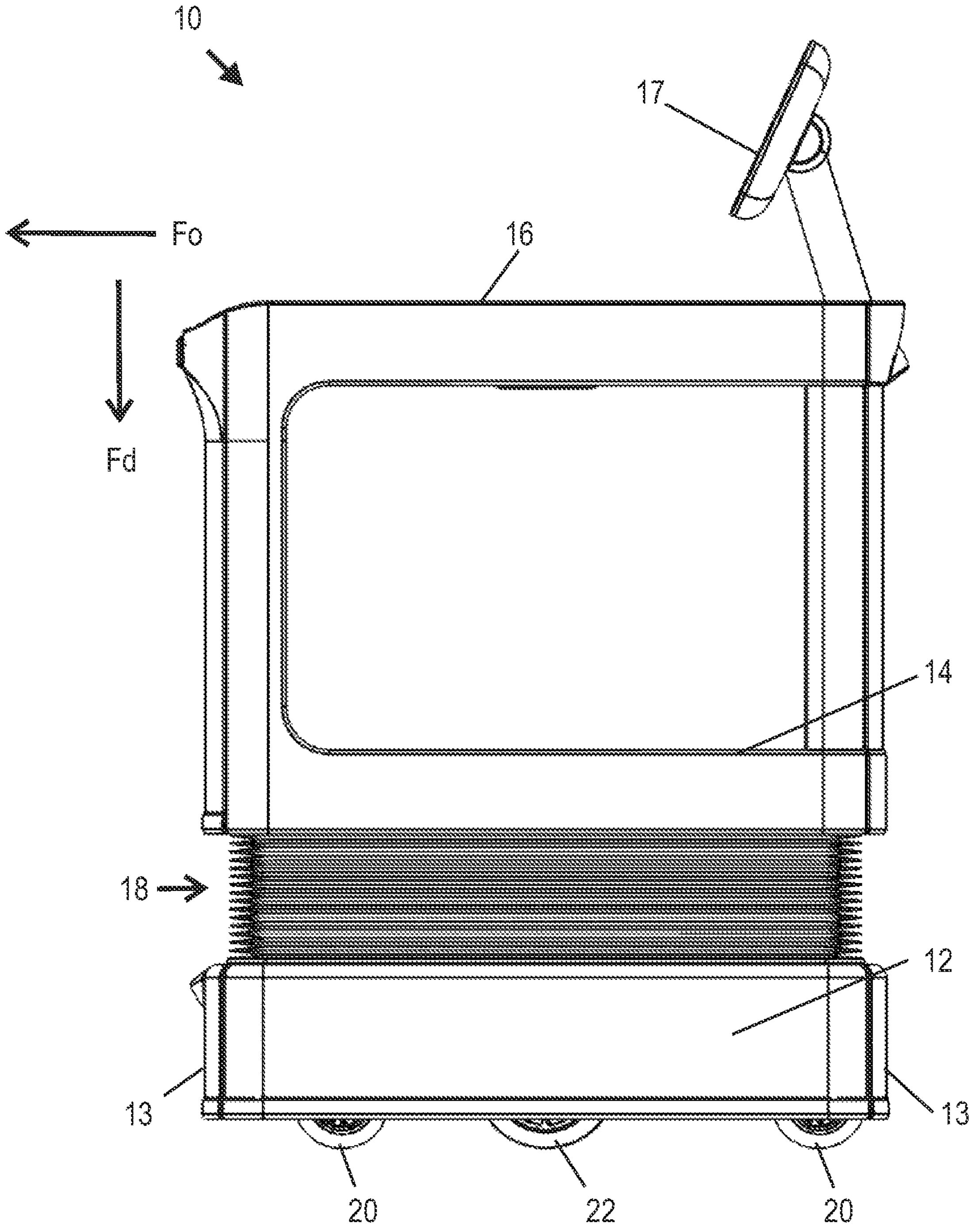
FIG. 1 (RELATED ART)
FIG. 1 is a side elevational view of a mobile robot embodied in a robotic item retrieval and/or transport apparatus.

In certain aspects, the present disclosure relates to a caster assembly including a hoof member configured to inhibit tipping of a mobile apparatus (such as a mobile robot) equipped with such a caster assembly (preferably multiple caster assemblies, such as at four corner areas thereof). A hoof member may be rigidly affixed to a support structure for a stem member of a caster assembly, or may be configured to pivot downward upon imposition of a downward vertical force on the stem member, to permit a portion of the hoof member to contact a travel surface on which a wheel of the caster is supported. Further aspects of the present disclosure relate to a mobile apparatus equipped with multiple caster assemblies, and to a method for inhibiting tipping of such a mobile apparatus when transiting an area including a travel surface bounded by a ledge, wherein a hoof member may be used to contact a travel surface when a wheel transits past the ledge. Additional aspects of the present disclosure relate to a method for facilitating autonomous navigation by a mobile robot of an unstructured residential environment, including mapping of locations of transit risk areas within the paths over which transit of the mobile robot at a first transit speed would cause an undue risk of shaking or spillage of cargo when borne by the mobile robot, and reducing transit speed of the mobile robot when in or near the transit risk areas. Further aspects of the present disclosure relate to a method for facilitating autonomous navigation by a mobile robot of an unstructured residential environment, including mapping of locations of one or more high transit effort areas within the paths over which manual pushing of the mobile robot would require a user to apply an amount of force exceeding a threshold force, and eliminating utilization by the mobile robot of paths including the one or more high transit effort areas in the absence of a user override of such utilization.

The term “mobile apparatus” as used herein broadly refers to a device that is subject to transit and/or positioning (either by its own motive power or by motive power supplied by a human or animal) within an environment. Non-limiting examples of mobile devices according to various embodiments include manually operable carts, autonomous vehicles, mobile delivery and/or retrieval robots, and mobility assistance devices.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only, and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly defined herein.

A mobile apparatus (including but not limited to a mobile robot) may be designed and configured to move large loads to assist individuals in residential settings. Such an apparatus should desirably exhibit an elevated degree of stability and increased resistance to tipping relative to commercial apparatuses (e.g., commercial robots). As a mobile apparatus configured for use in a residential setting is desired to be moved into different places around a residence, the apparatus may be pushed by a user and/or used inadvertently for bracing. Such a mobile apparatus may include four corner areas and four caster wheels each arranged at a respective corner area along a lower surface of a base of the apparatus. Caster wheels provide an effective and inexpensive solution for facilitating omnidirectional motion of a mobile apparatus. However, when caster wheels are rotated inward relative to a peripheral edge of a mobile apparatus, a wheel contact point with the floor inward relative to a peripheral edge (or outer envelope) of the mobile apparatus, making the mobile apparatus less stable and more prone to tipping (e.g., upon application thereto of an external force).

Figure 2:
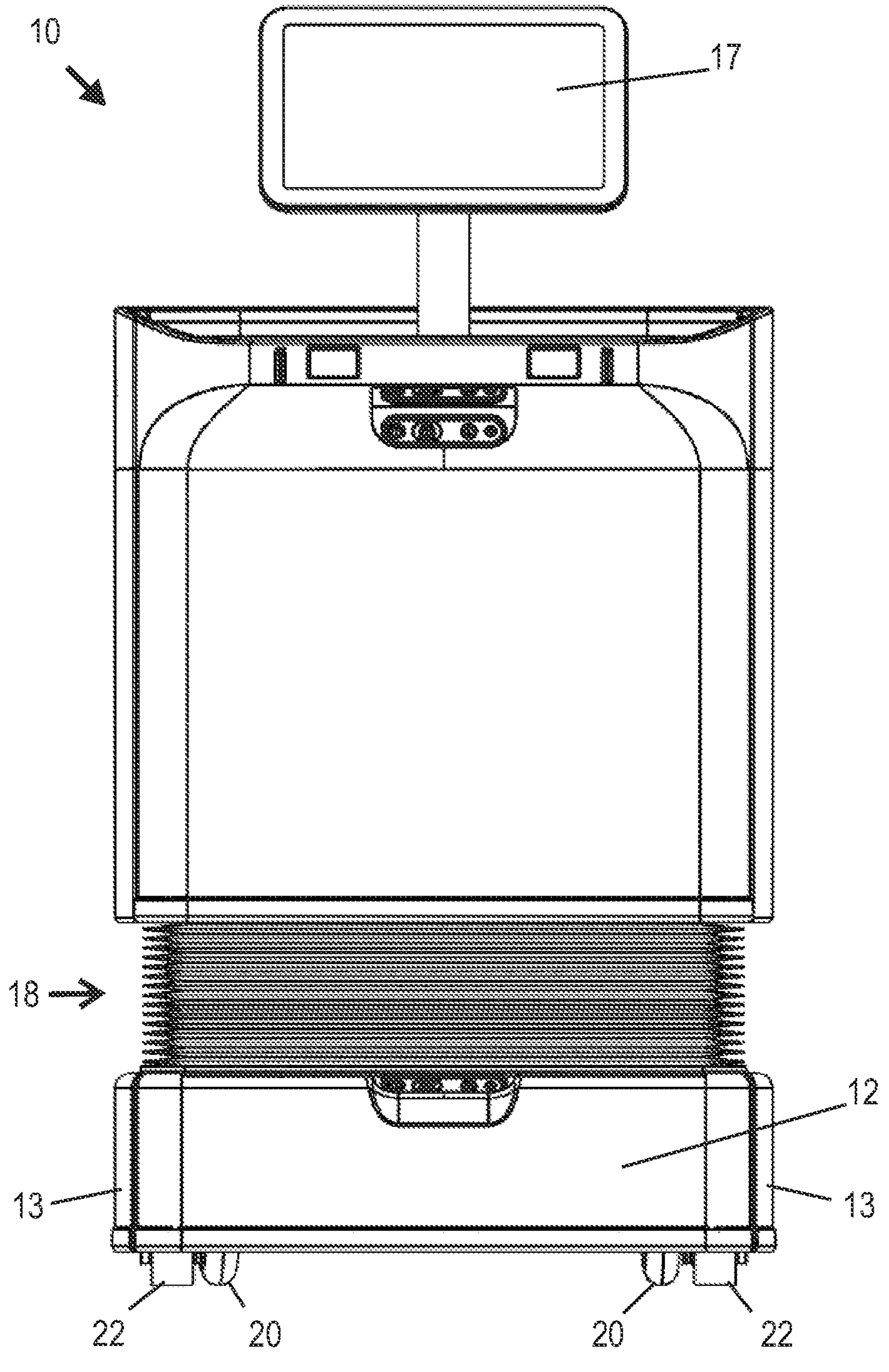
FIG. 2 (RELATED ART)
FIG. 2 is a front elevational view of the mobile robot of FIG. 1.

FIG. 1 is a side elevational view, and FIG. 2 is a front elevational view, of a mobile robot 10 embodied in a robotic item retrieval and/or transport apparatus, including a mobile base 12, a lower deck 14, an upper deck 16, a display screen 17, a height adjustment mechanism 18 (e.g., a scissor lift mechanism arranged within expandable bellows) positioned between the mobile base and the lower deck 14, peripheral casters 20 coupled with the mobile base 12 proximate to corner areas 13 thereof, and differential drive wheels 22 that are distal from the corner areas 13. The mobile robot 10 may be subject to tipping (e.g., tipping over) if at least one of the casters 20 are inset relative to the corner areas 13, and a downward force (Fd), optionally in combination with an outward force (Fo), is applied to an upper portion of the mobile robot 10.

To address this tipping risk, certain aspects of the present disclosure relate to a caster assembly that includes a hoof member, wherein the hoof member extends the effective footprint of the caster assembly and reduce the risk that a mobile apparatus including the caster assembly may be subject to tipping over. A wheel of a caster assembly has a horizontal center of rotation that is laterally offset in a first direction relative to a vertical axis of a stem member, and at least a portion of a hoof member is laterally offset in a second direction (opposing the first direction) relative to the vertical axis of the stem member. A hoof member may have any suitable shape, but in certain embodiments may have an arcuate shape when viewed from above, and may be arranged around at least 90 degrees, at least 135 degrees, at least 150 degrees, at least 180 degrees, or at least 210 degrees of a perimeter of a stem member. A hoof member may be arranged to be elevated from a travel surface (on which a wheel of the caster is supported) when the wheel is subject to being moved. When the caster assembly is rotated inward with a wheel thereof oriented generally toward a center of the mobile assembly (e.g., a mobile robot) supported by the caster assembly, the hoof member provides a lower surface elevated from the travel surface at a position closer to an outer periphery of the mobile assembly than the wheel. So positioned, the hoof member limits the degree to which the mobile assembly can tilt before the hoof member contacts the travel surface (e.g., floor), thereby making the mobile assembly more stable and less likely to tip over.

FIGS. 3-6 illustrate a caster assembly 30 that includes a generally cylindrical stem member 34 arranged to pivot relative to a vertical axis z and projecting upward relative to a collar 36 and a support structure 38, wherein the support structure 38 is arranged between the stem member 34 and a wheel 32 as well as a hoof member 50. The wheel 32 may be supported by an axle shaft 40 aligned with a horizontal axis x that corresponds to an axis of rotation of the wheel 32. The hoof member 50 comprises a body structure 52 having a generally arcuate shape with a curved peripheral edge 54 and terminal ends 56. In the embodiment shown in FIG. 3, the hoof member 50 is rigidly affixed to the support structure 38 and is not configured to pivot.

FIGS. 3-6 provide upper perspective, side elevational, front elevation, and top plan views, respectively, of the caster assembly 30.

Figure 3:
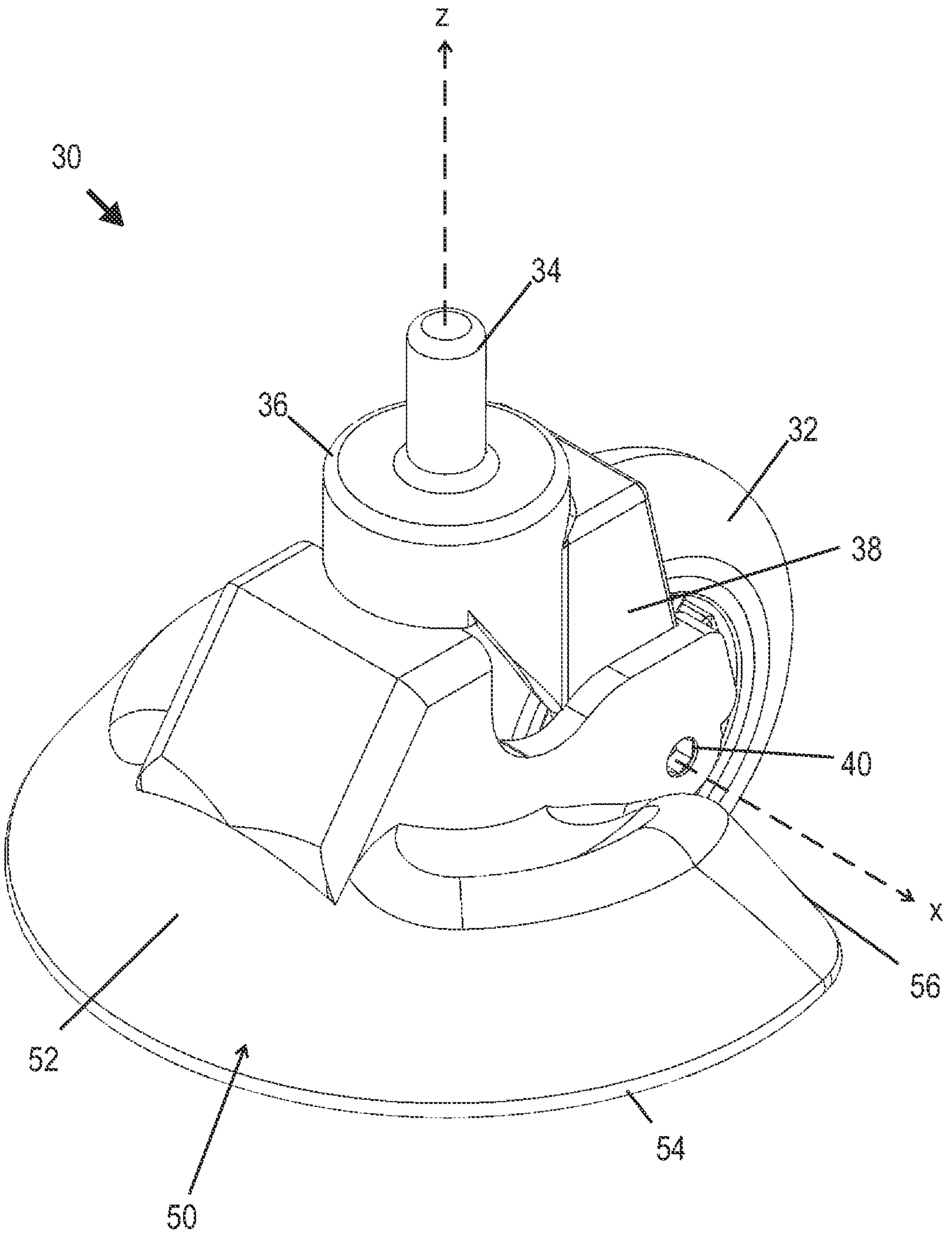
FIG. 3 is an upper perspective view of a caster assembly including a hoof member that is rigidly affixed to a support structure for a stem member according to one embodiment of the present disclosure.

As shown in FIG. 3 (and further shown in FIG. 4), the horizontal axis x of rotation of the wheel 32 is laterally offset from the vertical axis z in a first direction, and at least a portion of the hoof member 50 is laterally offset from the vertical axis z in a second direction that opposes the first direction.

Figure 4:
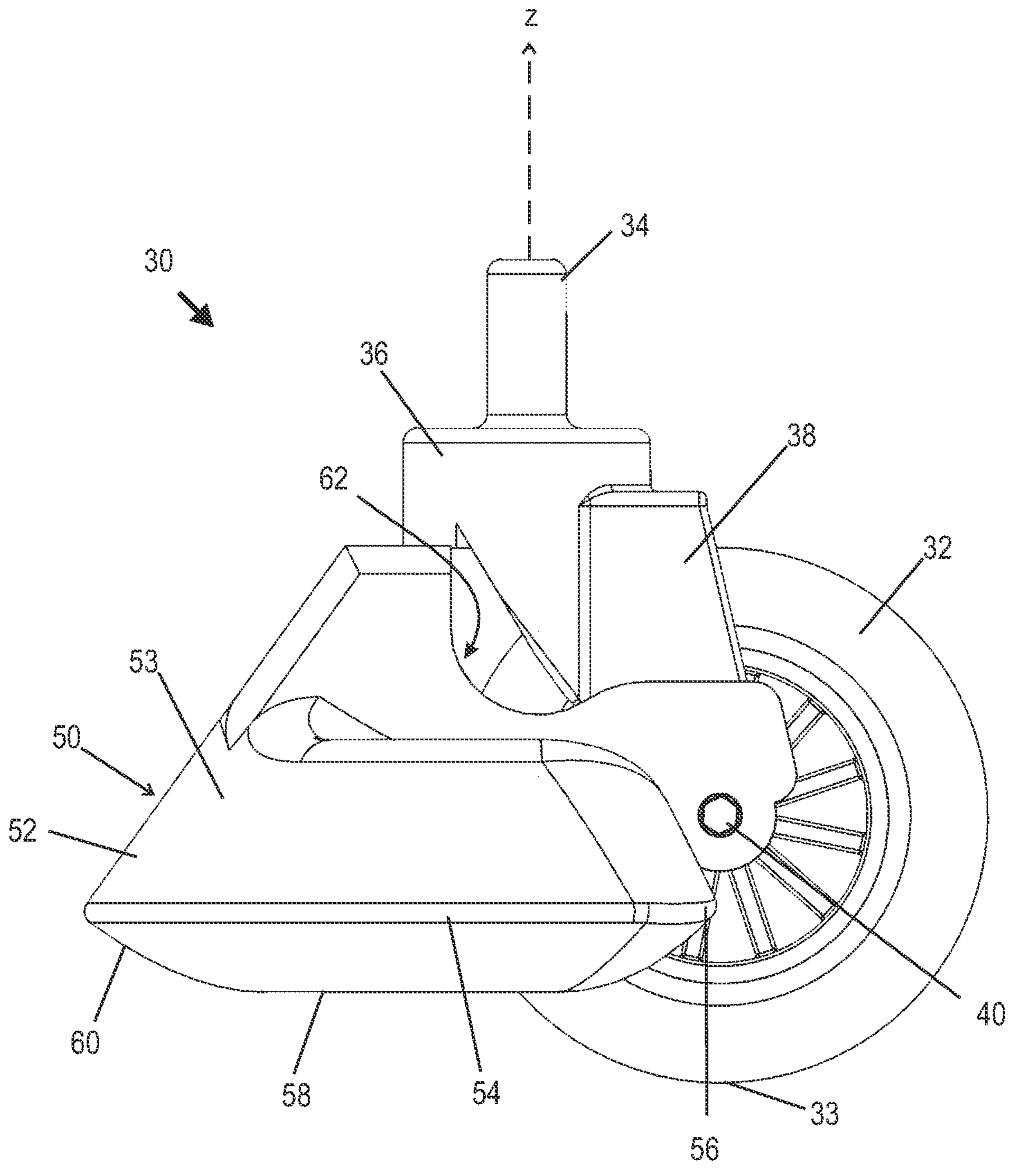
FIG. 4 is a side elevational view of the caster assembly of FIG. 3.
Figure 5:
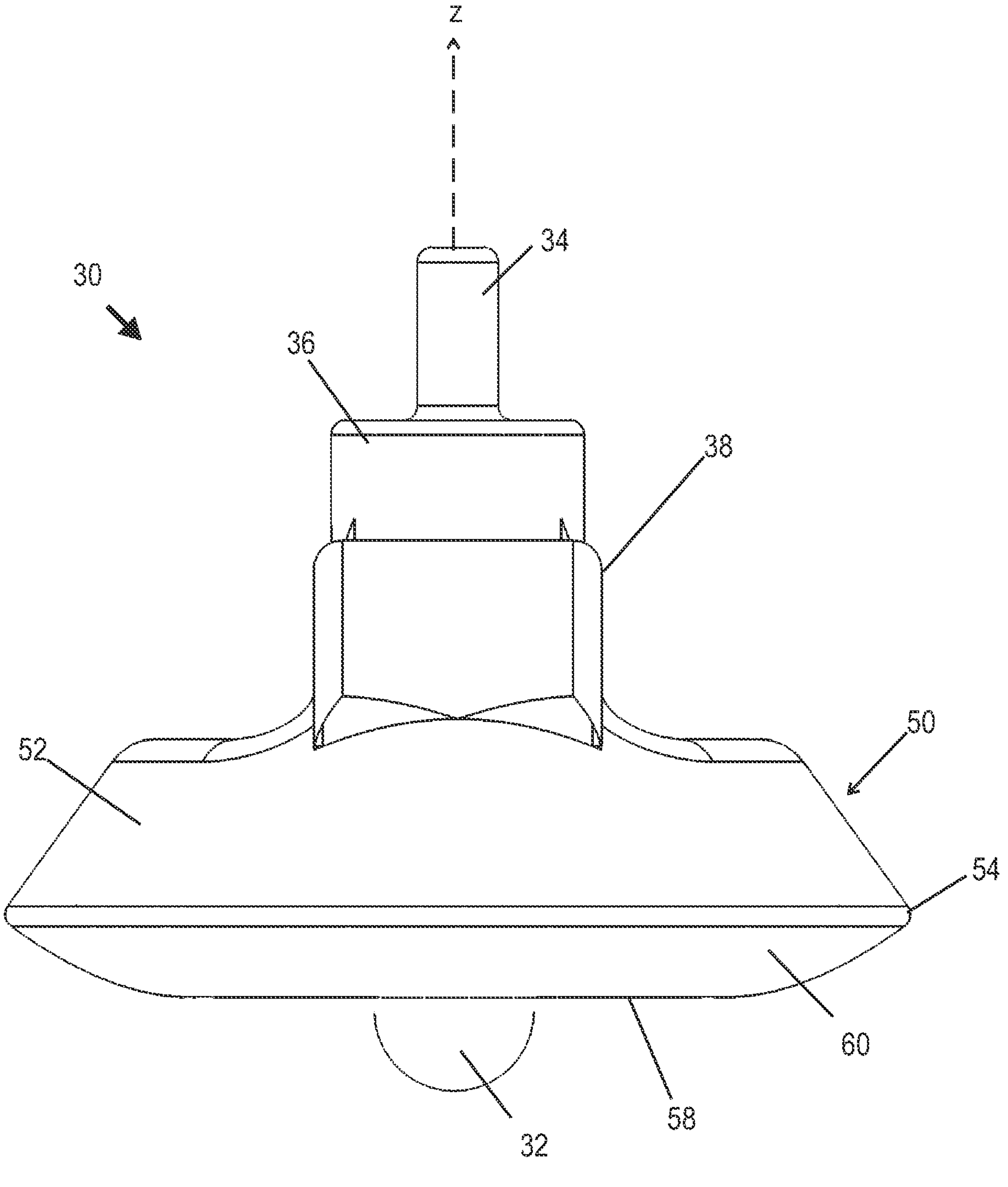
FIG. 5 is a front elevational view of the caster assembly of FIG. 3.
Figure 6:
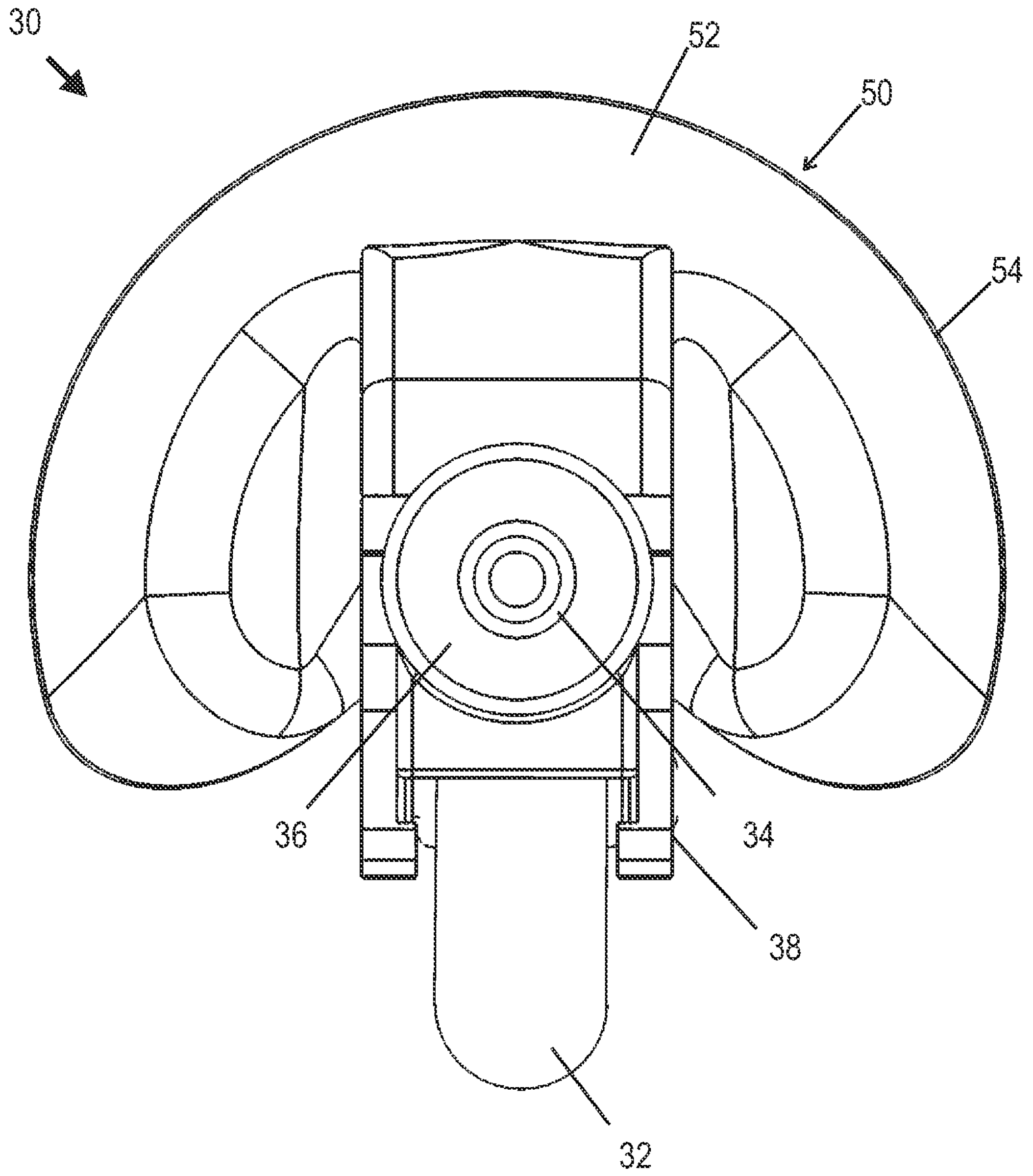
FIG. 6 is a top plan view of the caster assembly of FIG. 3.

Referring to FIG. 4, the body structure 52 may have an arcuate shape resembling a horseshoe when viewed from above, and may define a recess 62 (arranged generally below the stem 34) that receives at least a portion of the wheel 32. FIG. 4 further shows that the body structure 52 has an outer surface 53 that may be partially frustoconical in shape, tapering upward in a direction toward the stem member 34.

The body structure 52 additionally has a bottom surface 58 that is elevated relative to a bottom 33 of the wheel 32, with the bottom surface 58 including a transition region 60 along edges thereof that curves upward toward the peripheral edge 54. As further shown in FIG. 4, the terminal ends 56 of the body structure 56 may be nearly vertically aligned with, and below, the axle shaft 40 of the wheel 32.

FIGS. 7A to 10 illustrate at least portions of a caster assembly 130 according to another embodiment of the present disclosure, including a hoof member 150 that is configured to pivot downward responsive to imposition of a downward vertical force on a stem member 134. The caster assembly 130 includes a generally cylindrical stem member 134 arranged to pivot relative to a vertical axis z and projecting upward relative to a collar 136 and a support structure 138, wherein the support structure 138 is arranged between the stem member 134 and a wheel 132 as well as a hoof member 150. The wheel 132 may be supported by an axle shaft 140 aligned with a horizontal axis x that corresponds to an axis of rotation of the wheel 132. The hoof member 150 comprises a body structure 152 having a generally arcuate shape (e.g., resembling a horseshoe) when viewed from above, with a curved peripheral edge 154 and terminal ends 156. The body structure 152 further includes an outer surface 153 that may be partially frustoconical in shape, tapering upward toward the stem member 134. The caster assembly 130 includes a pivotal link member 142 arranged between the hoof member 150 and the wheel 132, wherein the pivotal link member 142 is configured to permit the hoof member 150 to pivot downward around a horizontal axis x (shown in FIGS. 8A-8B and 9) of rotation of the wheel 132, which corresponds to an axle shaft 140 of the wheel 132. The pivotal link member 142 is coupled with a spring 144 that is configured to exert a restoring force to counteract downward pivotal movement of the hoof member 150, with the spring 144 being arranged between an upper landing region 137 of the support structure 138 and a lower landing region 143 of the pivotal link member 142.

The caster assembly 130 further includes a drag link member 146 composed of an upper portion 146A and a lower portion 146B, wherein a bend or directional change is provided between the upper and lower portions 146A-146B at a joint 148. The drag link member 146 is pivotally coupled with and arranged to pivot relative to the hoof member 150 at the joint 148. The upper portion 146A of the drag link member is configured to slide relative to a slot 145 defined in a slot forming member 138' (or slot forming portion) of the support structure 138. The lower portion 146B of the draft link member 146 extends through a cavity 163 (which may resemble a slot, and may be a continuous portion of the recess 162, shown in FIGS. 9 and 10) defined in the body structure 152 to protrude downward below a lower surface 158 of the hoof member 150. The caster assembly 130 is configured to cause the lower portion 146B of the drag link 146 and a portion of the hoof member 150 in simultaneous contact with a travel surface supporting the wheel 132 when in a deployed state, responsive to imposition of a downward vertical force on the stem member 134.

Figure 7A:
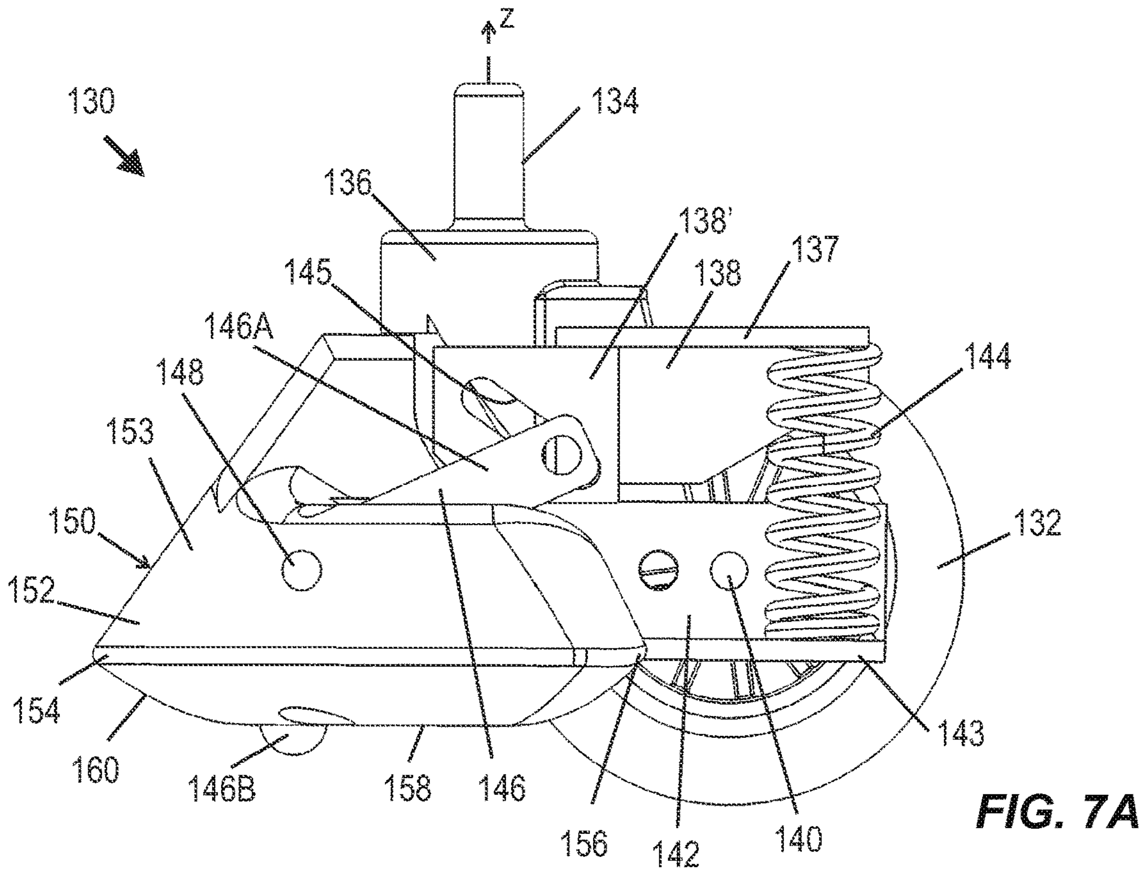
FIG. 7A is a side elevational view of a caster assembly according to another embodiment of the present disclosure, the caster assembly including a stem member, a wheel, a hoof member, a pivotal link, a drag link, and a spring, wherein the hoof member is configured to pivot downward upon imposition of a downward vertical force on the stem member, and the hoof member is illustrated in a non-deployed state.
Figure 7B:
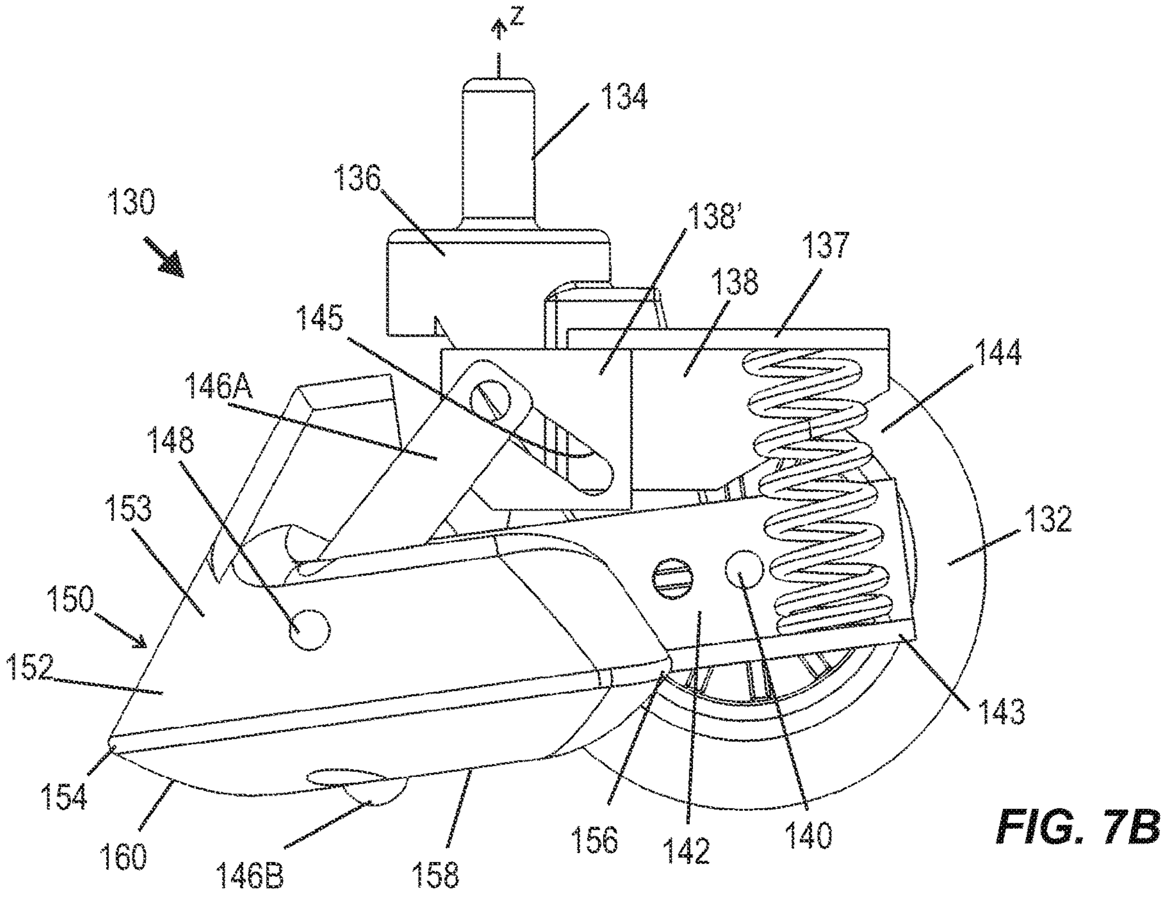
FIG. 7B is a side elevational view of the caster assembly of FIG. 7A, with the hoof member illustrated as being in a deployed state with the hoof member pivoted downward.
Figure 8A:
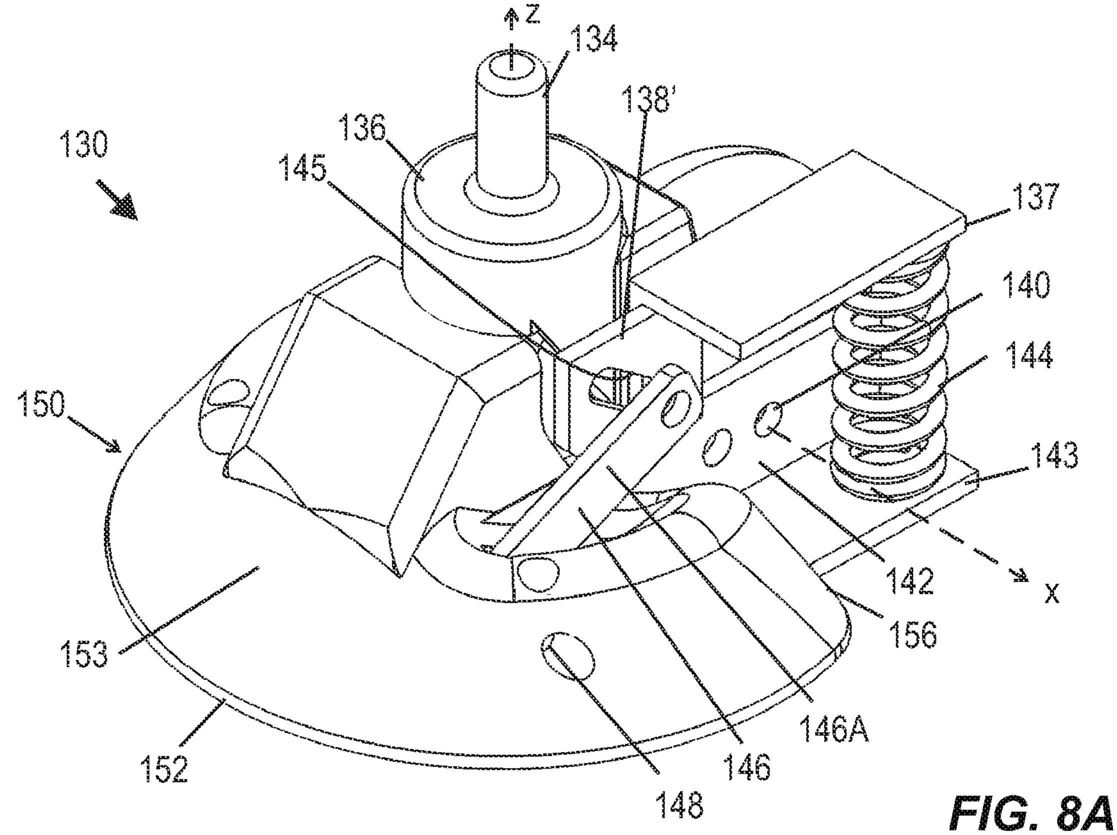
FIG. 8A is an upper perspective view of the caster assembly according to FIGS. 7A-7B in the non-deployed state.
Figure 8B:
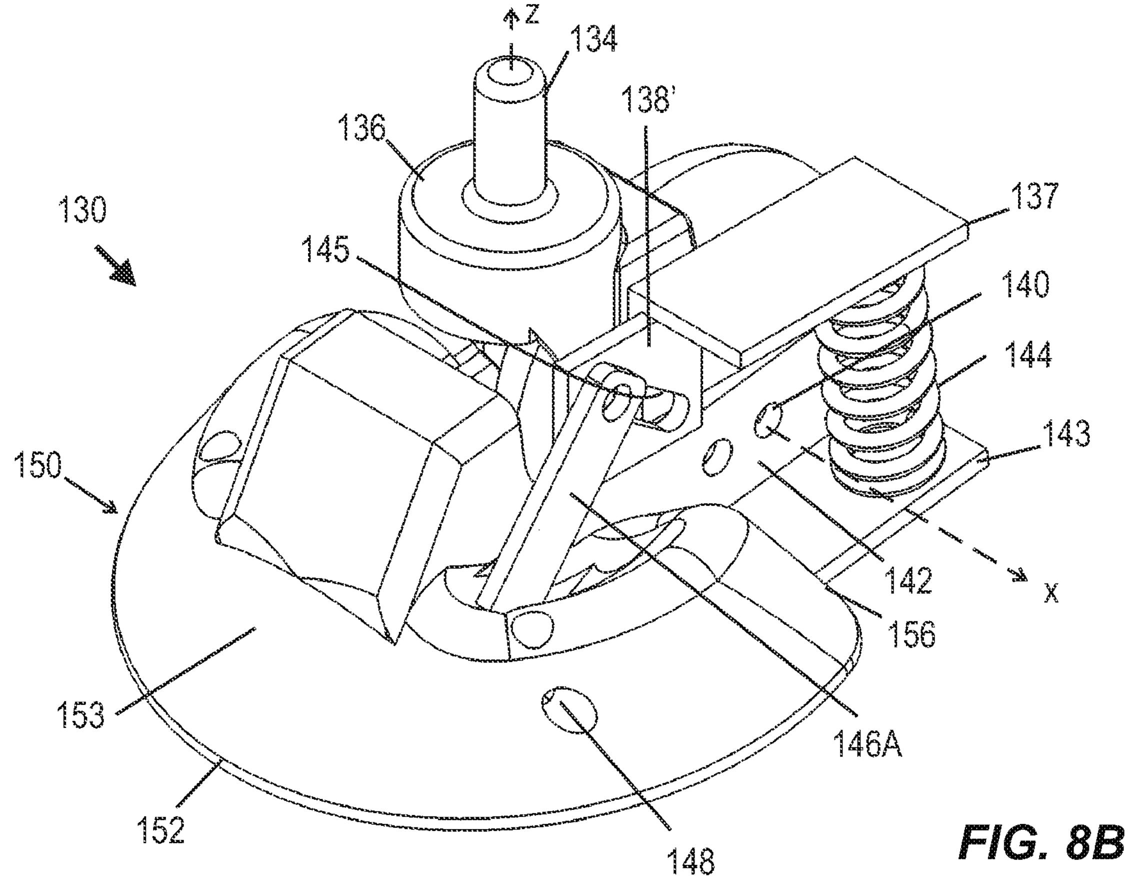
FIG. 8B is an upper perspective view of the caster assembly according to FIGS. 7A-7B in the deployed state.

FIGS. 7A and 8A show the caster assembly 130 showing the hoof member 150 in a non-deployed state, with an entirety of the hoof member 150 and the lower portion 146B of the drag link 146 being arranged at a level above a bottom of the wheel 132. FIGS. 7B and 8B show the caster assembly 130 with the hoof member 150 in a deployed state, with the pivotal link 142 being tilted (angled) downward and with the drag link member 146 also being pivoted relative to the joint 148, to cause the upper portion 146A to slide in a downward direction in the slot 145, and to cause the lower portion 146B to tilt in a direction toward the wheel 132. In this actuated position, the lower portion 146B may function akin to a kickstand. When a downward vertical force initially transmitted through the stem member 134 is removed, a restoring force exerted by the spring 144 serves to return the caster assembly to the non-deployed state.

Figure 9:
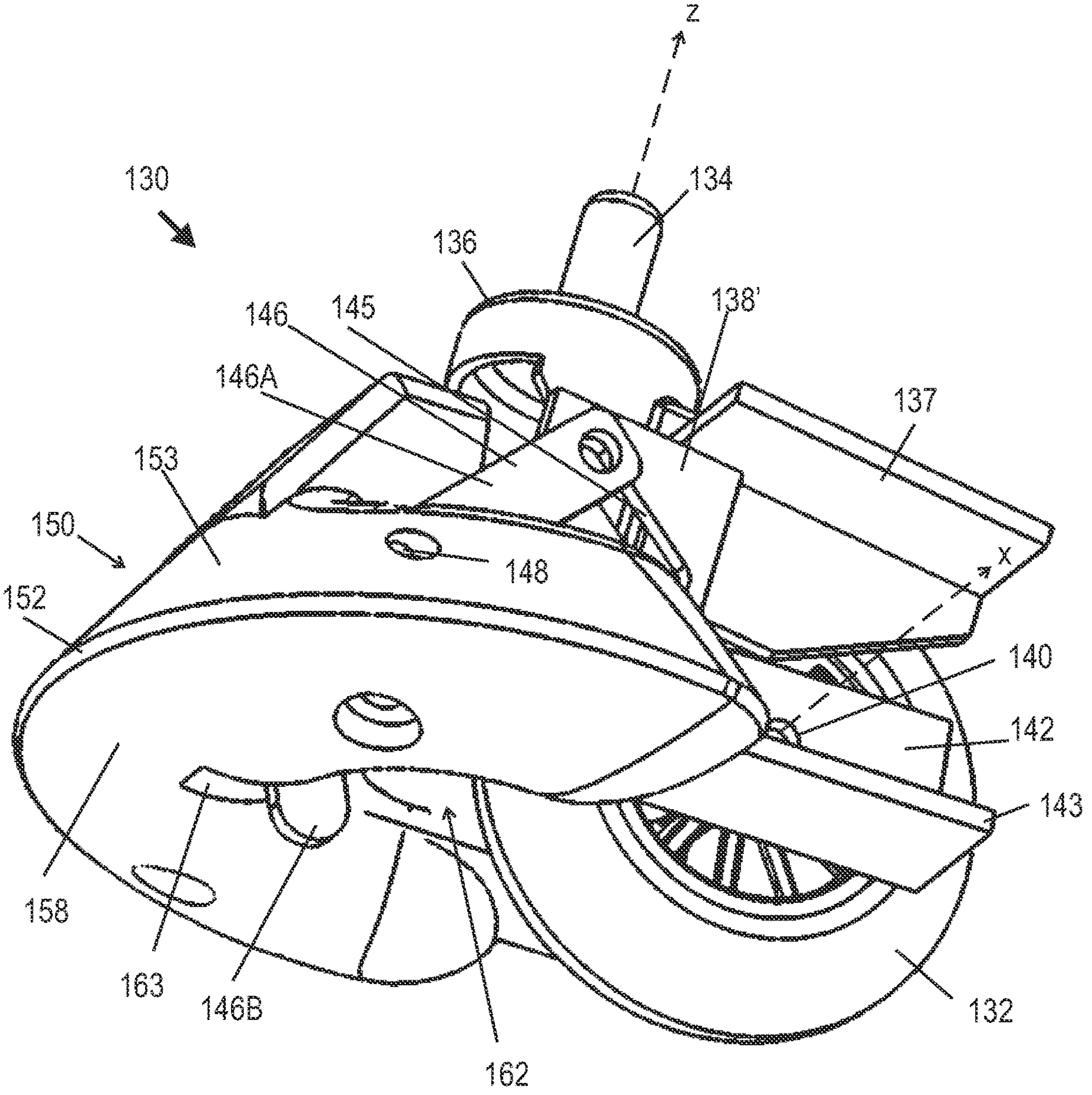
FIG. 9 is a lower perspective view of a portion of the caster assembly of FIGS. 7A-7B (e.g., omitting the spring) in the non-deployed state.
Figure 10:
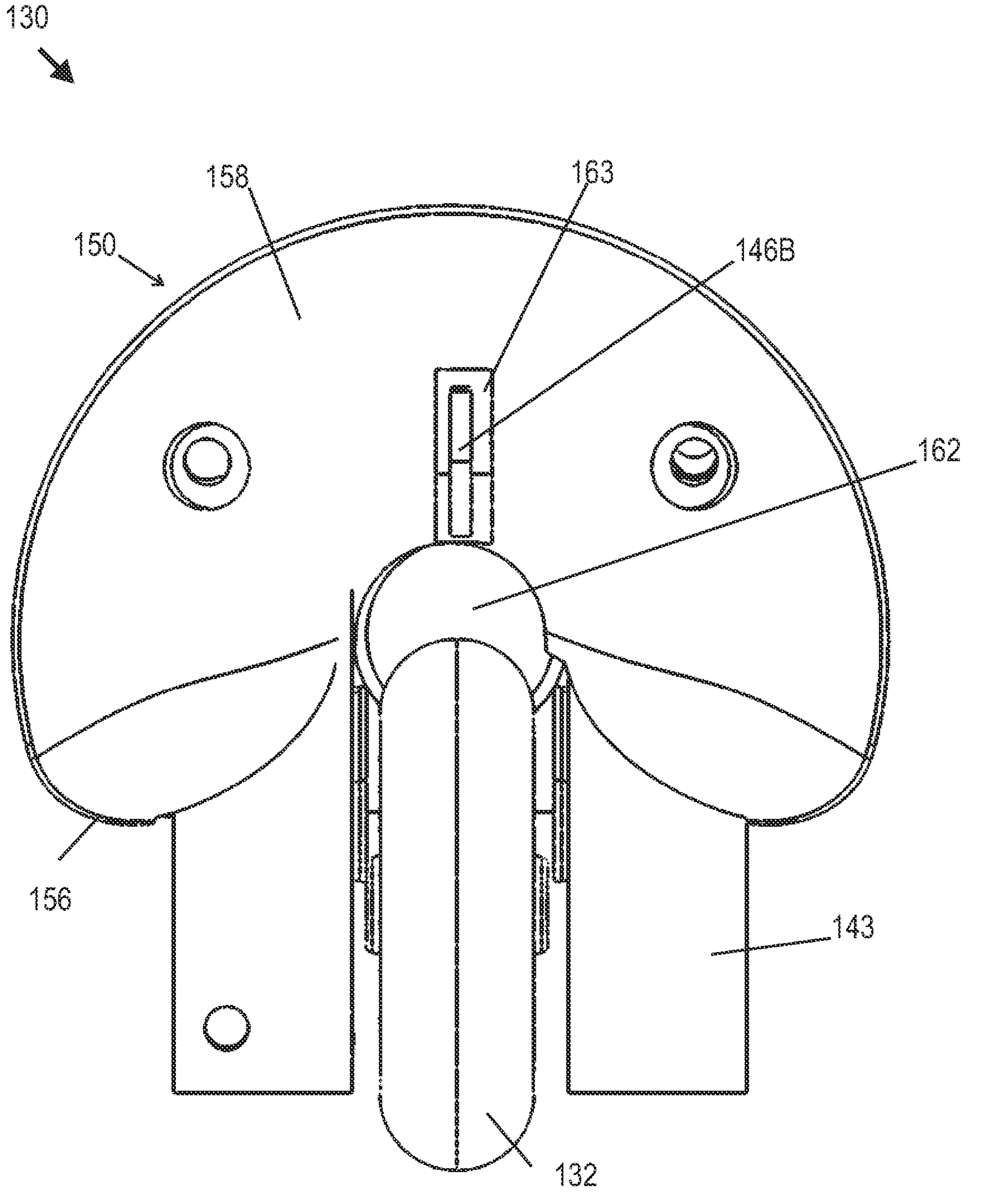
FIG. 10 is a bottom plan view of the caster assembly portion of FIG. 9.

FIG. 9 is a lower perspective view of a portion of the caster assembly of FIGS. 7A-7B (e.g., omitting the spring) in the non-deployed state, while FIG. 10 is a bottom plan view of the caster assembly portion of FIG. 9.

Although FIGS. 7A to 10 show a single pivotal link, a single drag link, and a single spring along one side of the caster assembly 130, it is to be appreciated that corresponding elements may also be provided on the other side of the caster assembly, so that a resulting caster assembly has two of each of the foregoing elements, to provide balanced forces and reliable operation.

Figure 11A:
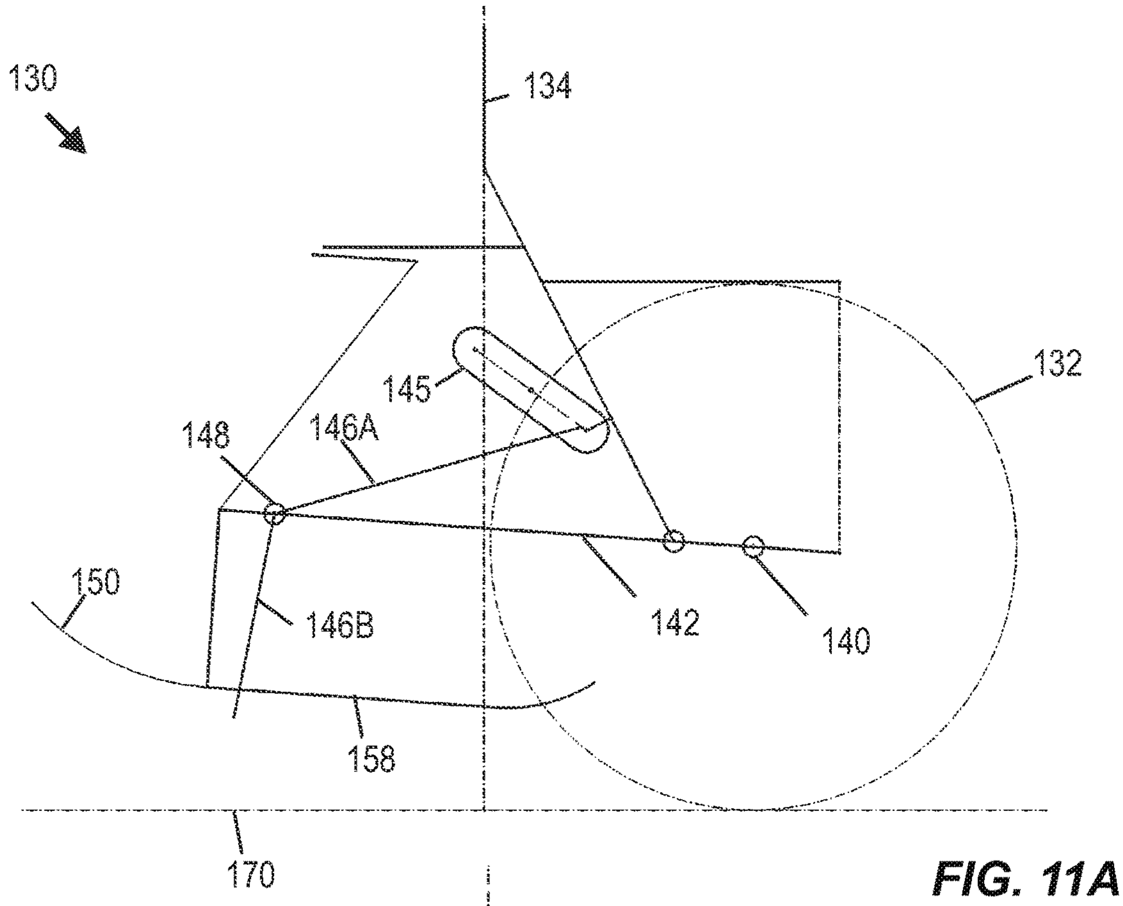
FIGS. 11A-11B are kinematic diagrams of the caster assembly of FIGS. 7A-7B in the non-deployed state and deployed state, respectively.
Figure 11B:
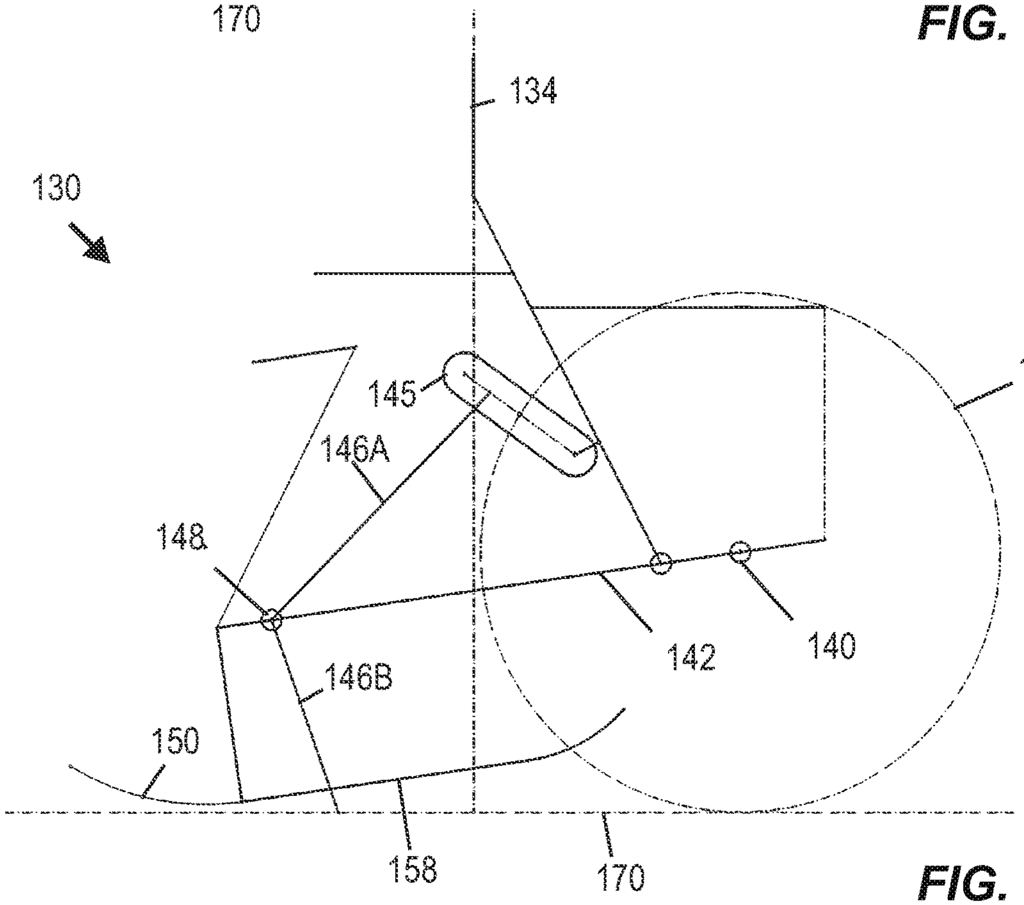

FIGS. 11A-11B are kinematic diagrams of the caster assembly 130 of FIGS. 7A-7B in the non-deployed state and deployed state, respectively. Simplified representations of the stem member 134, the wheel 132, the wheel axle 140, the pivotal link member 142, the upper and lower portions 146A-146B of the drag link member, the slot 146, the hoof member 150, the lower surface 158 of the hoof member, and a travel surface 170 are provided. As shown in FIG. 11A, when the caster assembly 130 is in the non-deployed state, the pivotal link member 142 is in a roughly horizontal configuration and the wheel 132 is in contact with the travel surface 170, but no portion of the hoof member 150 and no portion of the lower portion 146 of the drag link member are in contact with the travel surface. Conversely, FIG. 11B shows that when the caster assembly 130 is in the deployed state, the pivotal link member 142 is tilted somewhat downward, while portions of both the hoof member 150 (along a lower surface 158 thereof) and the lower portion 146 of the drag link member are in contact with the travel surface 170 simultaneously (together with the wheel 132 being in contact with the travel surface 170).

Figure 12:
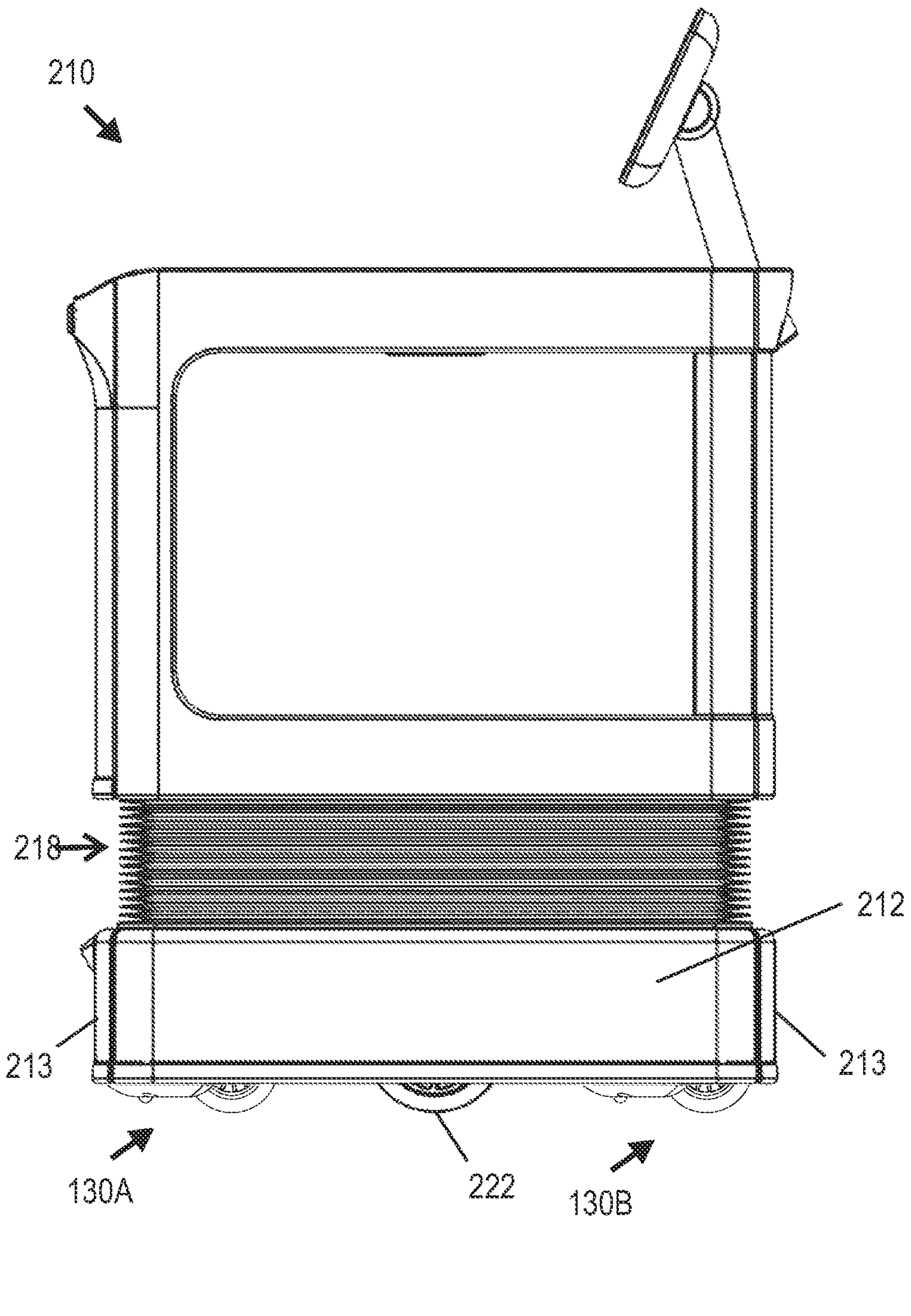
FIG. 12 is a side elevational view of a mobile robot (embodied in a robotic item retrieval and/or transport apparatus) including four caster assemblies according to FIGS. 7A-7B arranged proximate to corner areas thereof, with differential drive wheels being medially arranged distal from the corner areas, with each caster assembly in a non-deployed state, and with each caster assembly oriented in the same direction.

FIG. 12 is a side elevational view of a mobile robot 210 (embodied in a robotic item retrieval and/or transport apparatus) including four caster assemblies 130 (including 130A-130B as shown) each according to FIGS. 7A-7B arranged proximate to corner areas 213 thereof, with differential drive wheels 222 being medially arranged distal from the corner areas 222, with each caster assembly 130A, 130B in a non-deployed state, and with each caster assembly 130A, 130B oriented in the same direction. This orientation of the caster assemblies 130A, 130B may be obtained when the mobile robot 210 is moved in a straight line (e.g., from right to left as illustrated), assuming that each caster assembly is of the same general configuration.

Figure 13:
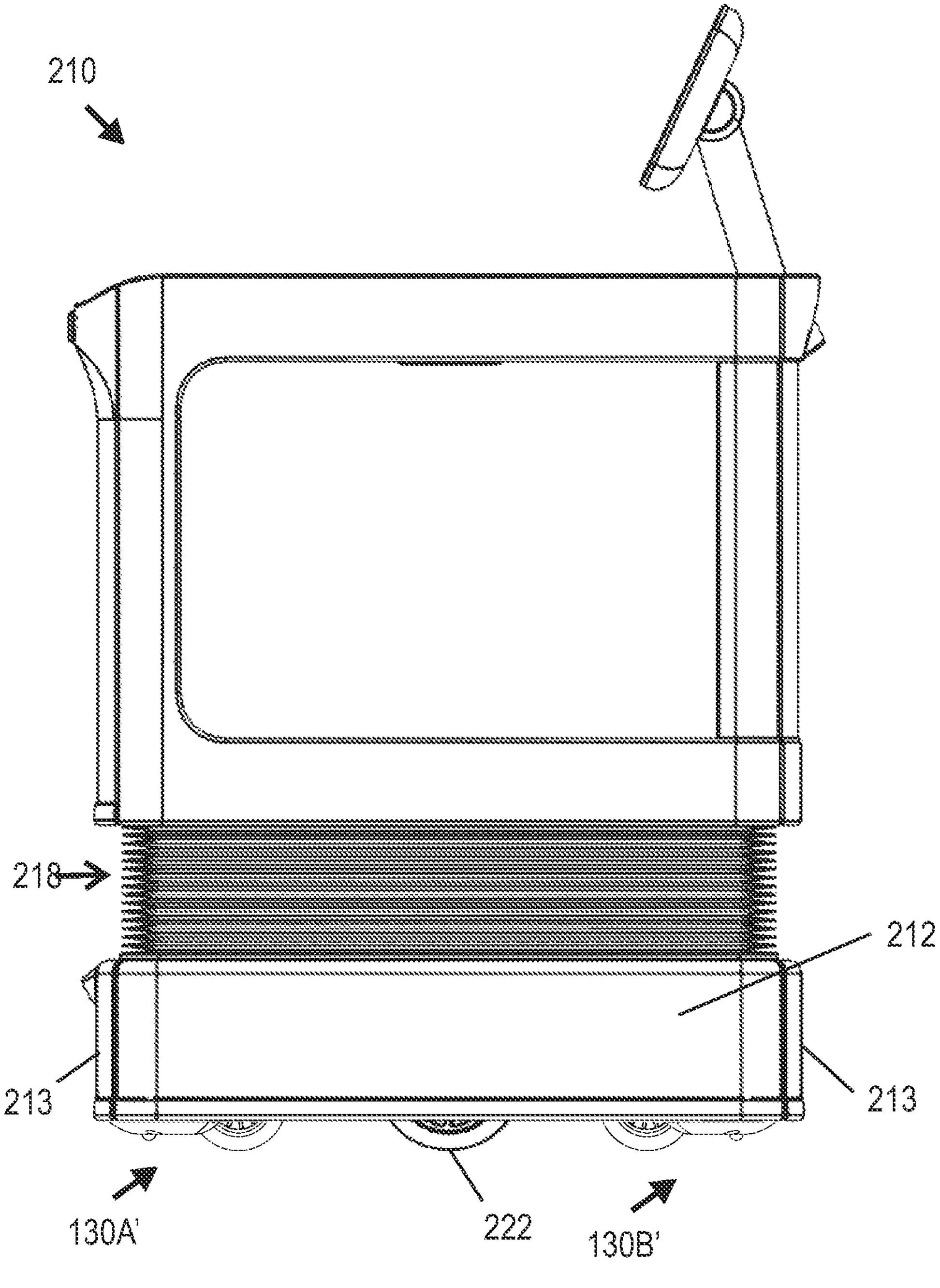
FIG. 13 is a side elevational view a mobile robot substantially the same as the mobile robot of FIG. 12, but with at least certain caster assemblies being oriented in different directions.

FIG. 13 is a side elevational view of a mobile robot 210 substantially the same as the mobile robot of FIG. 12, but with at least certain caster assemblies 130A', 130B' being oriented in different directions. In certain embodiments, this orientation of the caster assemblies 130A', 130B' may be obtained in a transitional period when the mobile robot 210 has been swung to one side and prepared for movement in a straight line. In certain embodiments, the caster assemblies 130A', 130B' may be of differing types and designed to be oriented as shown when the mobile robot is moved in a straight line (e.g., from right to left or from left to right illustrated).

As noted previously, a mobile delivery robot incorporating casters may encounter a ledge (e.g., at the top of one or more stairs) and be susceptible to either toppling or becoming stuck if one or more casters transit over the ledge. This risk may be mitigated using caster assemblies according to embodiments disclosed herein.

Figure 14A:
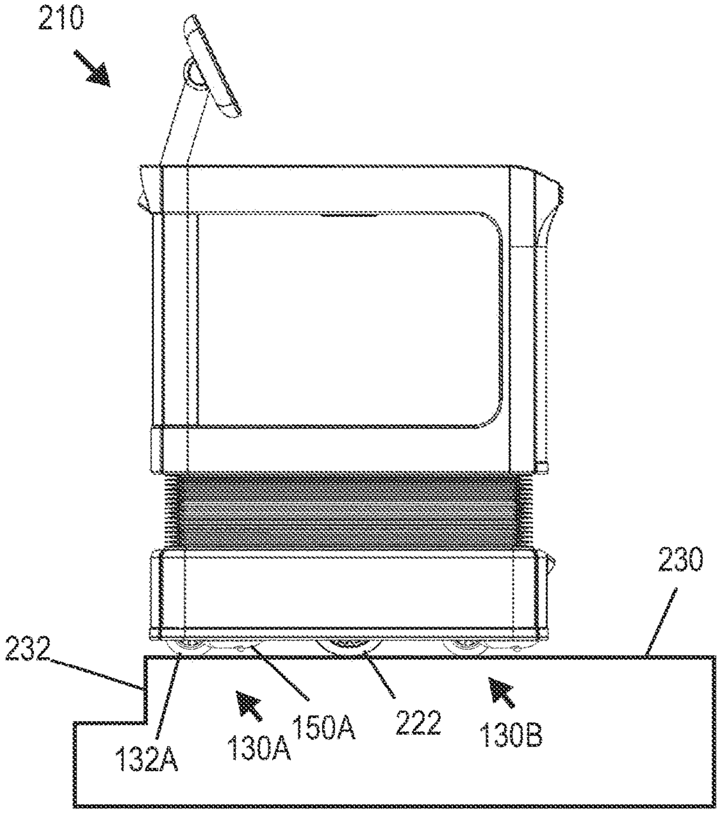
FIG. 14A is a side elevational view of the mobile robot of FIG. 12 with all caster assemblies supported by a travel surface proximate to a ledge.

FIG. 14A is a side elevational view of the mobile robot 210 of FIG. 12 with wheels of all caster assemblies 130A, 130B (with a first caster assembly 130A including a wheel 132A and a hoof member 150A) supported by a travel surface 230 proximate to a ledge 232.

Figure 14B:
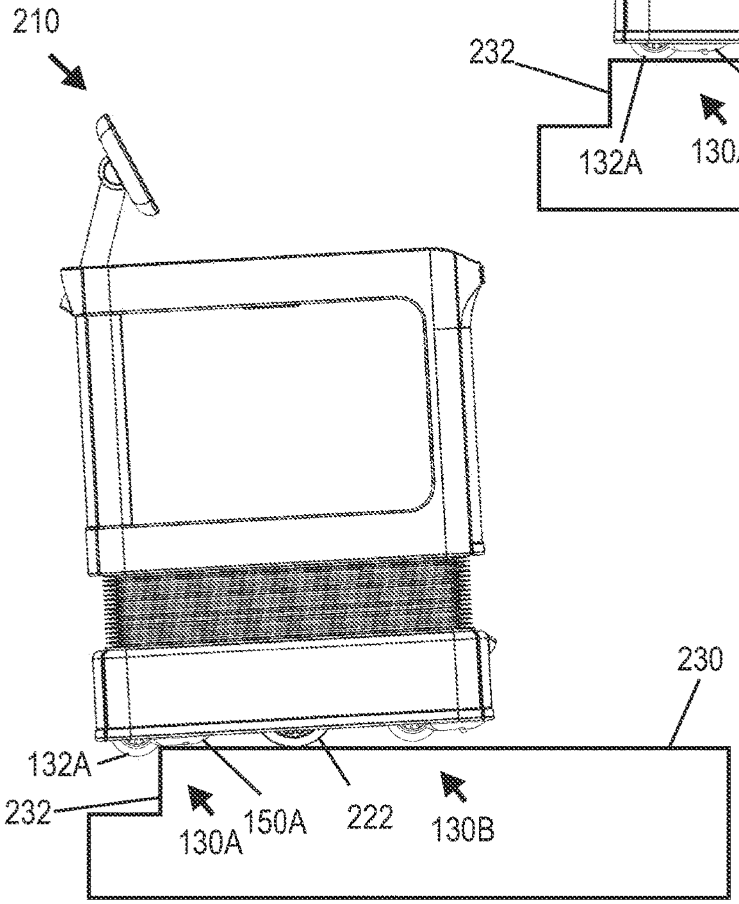
FIG. 14B is a side elevational view of the mobile robot of FIG. 14A in a partially tipped condition following transit of wheels of one or more caster assemblies over the ledge, showing a hoof member arranged in contact with the travel surface proximate to the ledge.

FIG. 14B is a side elevational view of the mobile robot 210 of FIG. 14A in a partially tipped condition, following transit of the wheel 132A of at least one caster assembly 130A over (past) the ledge 232, showing a hoof member 150A of the caster assembly 130A arranged in contact with the travel surface 230 proximate to the ledge 232. Such robot 210 may be used in a method for inhibiting tipping of the mobile robot when transiting an area including the travel surface 230 bounded by the ledge 232, the method comprising: upon passage of a wheel 132A of at least one caster assembly 130A over the ledge 232, contacting the travel surface 230 proximate to the ledge 232 with at least a portion of a bottom surface of a hoof member 150A of the at least one caster assembly 130A. In certain embodiments, the method further comprises moving the mobile apparatus 210 (either manually or using the differential drive wheels 222) to cause the wheel 132A of the at least one caster assembly to re-engage the travel surface 230.

In certain embodiments, a caster assembly comprises a wheel that is spring-biased and configured to travel or pivot in a generally upward direction, and comprises a hoof member that is not configured to travel upwardly (or has less travel in an upward direction relative to a wheel). When a downward vertical force is imposed on the stem member, the spring is compressed and the wheel travels in a generally upward direction, permitting a portion of the hoof member to contact a travel surface on which the wheel is supported. This represents a different configuration but a similar technical effect to the caster assembly 130 illustrated and previously (e.g., in connection with FIGS. 7A to 9). One example of a caster assembly 330 including a spring-biased wheel is shown in FIGS. 15A-15B and 16A-16B.

Referring to FIGS. 15A to 16B, the caster assembly 330 includes a generally cylindrical stem member 334 arranged to pivot relative to a vertical axis z and projecting upward relative to a collar 336 and a support structure 338, wherein the support structure 338 is arranged between the stem member 334 and the wheel 332 as well as a hoof member 350. The wheel 332 may be supported by an axle shaft 340 aligned with a horizontal axis x that corresponds to an axis of rotation of the wheel 332. The hoof member 350 comprises a body structure 352 having a generally arcuate shape (e.g., resembling a horseshoe) when viewed from above, with a curved peripheral edge 354 and terminal ends 356. The body structure 352 further includes an outer surface 353 that may be partially frustoconical in shape, tapering upward toward the stem member 334. The caster assembly 330 includes a pivotal link member 342 arranged between a horizontal upper member 346 (affixed to the hoof member 350) and the wheel 332, wherein the pivotal link member 342 is configured to permit the wheel 332 to pivot/travel in a generally upward direction around a pivot shaft 345. The pivotal link member 342 is coupled with a spring 344 that is configured to exert a restoring force to counteract upward (e.g., pivotal) movement of the wheel 332, with the spring 344 being arranged between an upper landing region 337 of the support structure 338 and a lower landing region 343 of the pivotal link member 342. When the caster assembly 330 is coupled to a mobile apparatus as described herein, upon imposition of a downward vertical force on the stem member, the wheel 332 is permitted to travel upward, eventually to a degree that a bottom surface 358 of the hoof member 350 will contact a travel surface on which the wheel 332 is supported, thereby rendering the mobile assembly more stable and less likely to tip over.

Figure 15A:
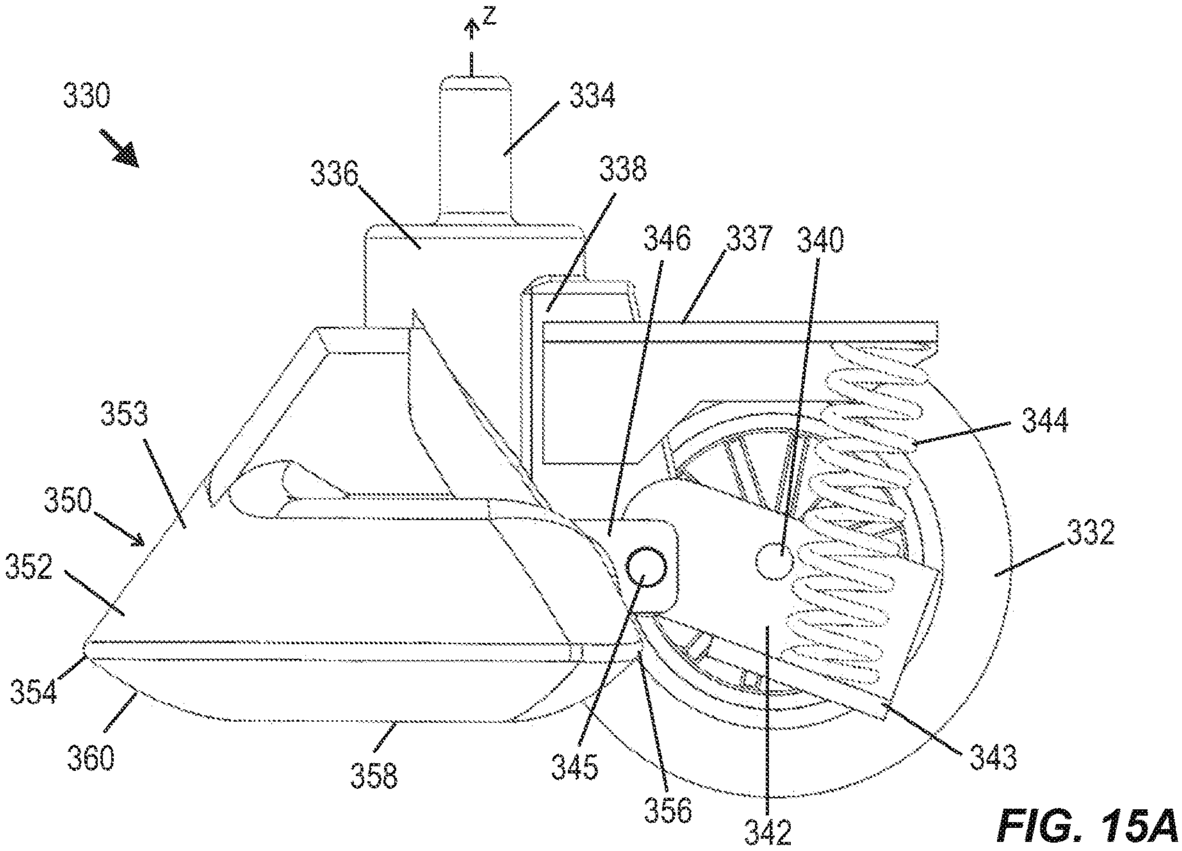
FIG. 15A is a side elevational view of a caster assembly according to another embodiment of the present disclosure permitting upward travel of a wheel without travel by a hoof member, the caster assembly including a stem member, a wheel, a hoof member, a pivotal link, and a spring, wherein the wheel is spring-biased in a generally downward direction and configured to travel upward upon imposition of a downward vertical force on the stem member, with the wheel in a downward state with a bottom surface thereof located at a horizontal plane lower than a bottom of the hoof member.
Figure 15B:
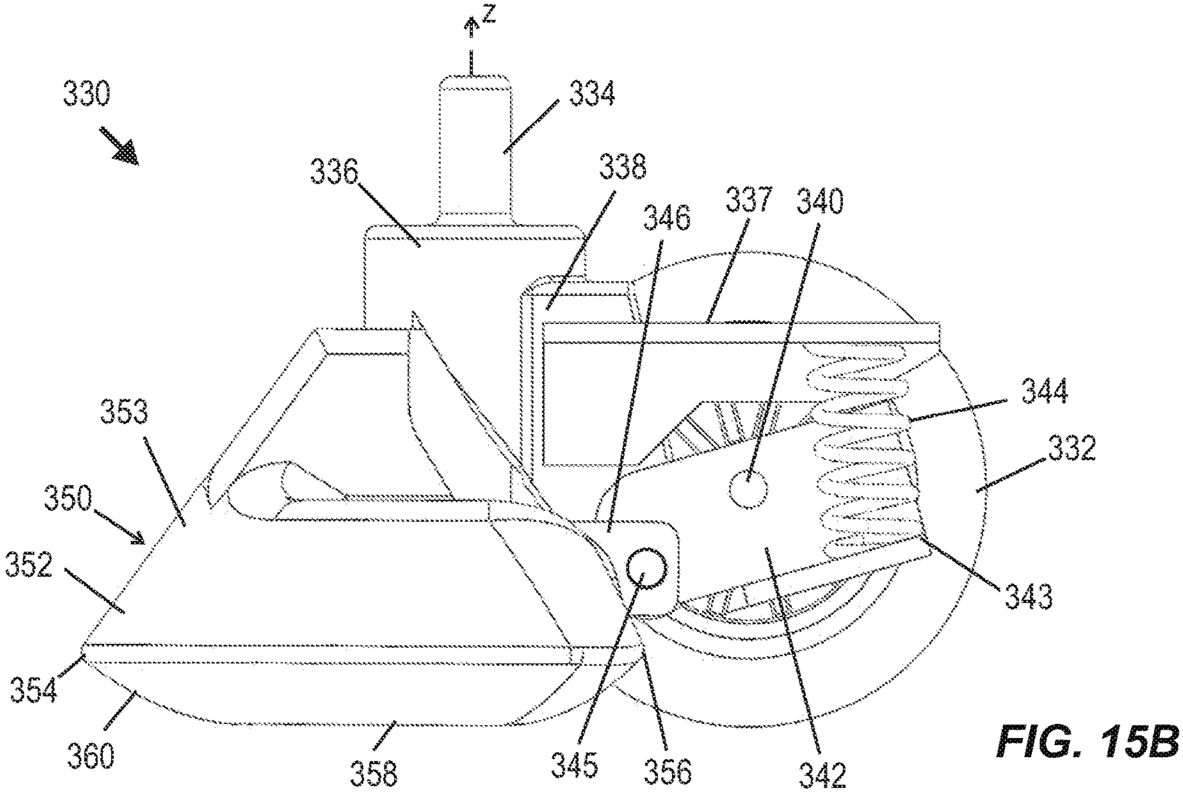
FIG. 15B is a side elevational view of the caster assembly of FIG. 15A with the spring being compressed and with the wheel in an upward state, the wheel having a bottom surface located at a same horizontal plane as the bottom of the hoof member.
Figure 16A:
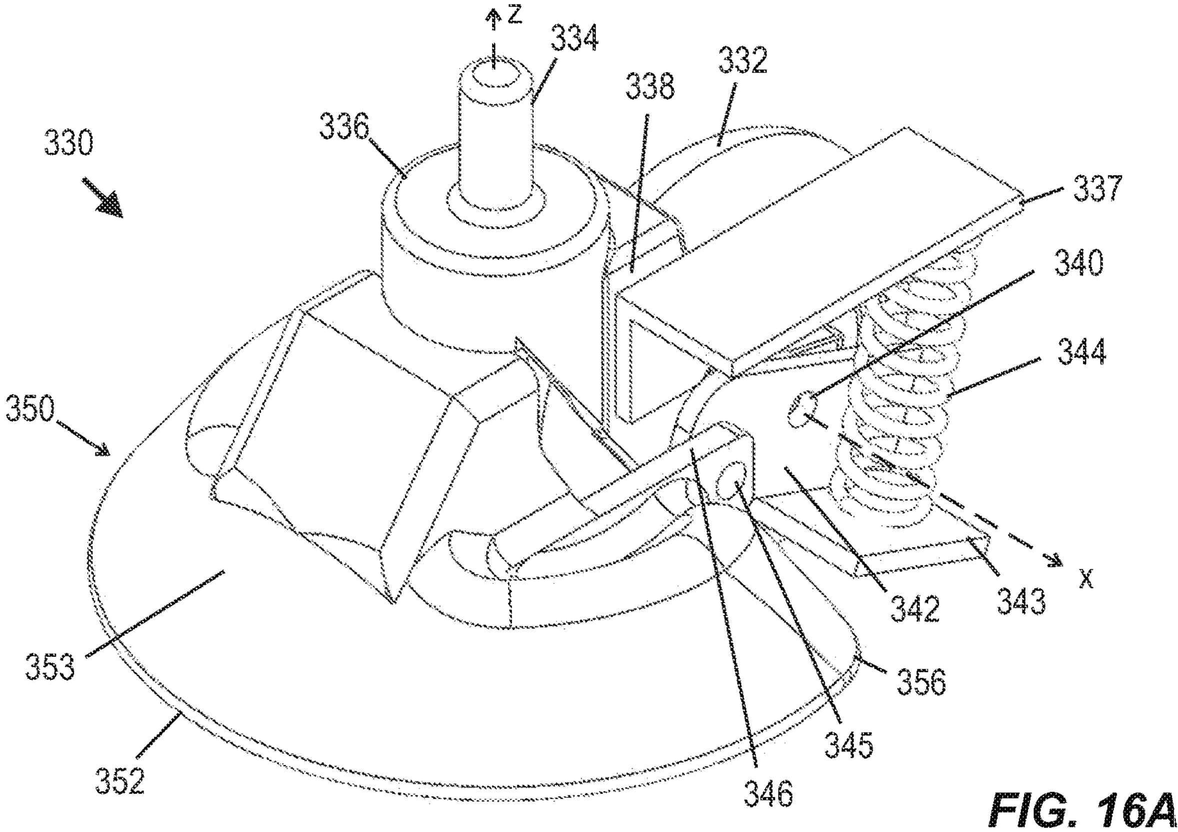
FIG. 16A is an upper perspective view of the caster assembly of FIGS. 15A-15B in the same state as illustrated in FIG. 15A.
Figure 16B:
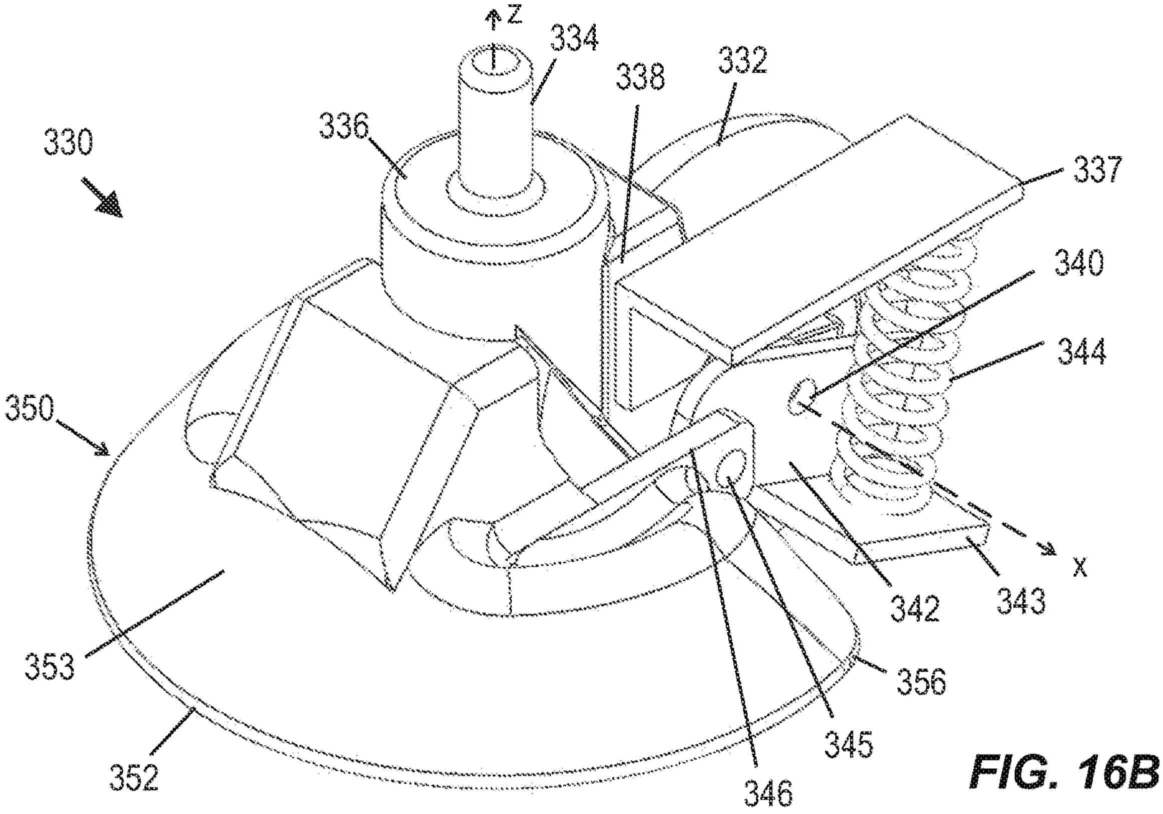
FIG. 16B is an upper perspective view of the caster assembly of FIGS. 15A-15B in the same state as illustrated in FIG. 15B.

FIGS. 15A and 16A show the caster assembly 330 with the wheel 332 in a downward state (with the spring 344 in a non-compressed or minimally compressed state), with a bottom surface of the wheel located at a horizontal plane lower than the bottom 358 of the hoof member 350. Conversely, FIGS. 15B and 16B show the caster assembly 330 with the wheel 332 in an upward state (upon imposition of a downward force on the stem member 334 to compress the spring 344 and cause the wheel 332 and pivotal link 342 to travel/rotate upward), with the wheel having a bottom surface located at a same horizontal plane as the bottom surface 358 of the hoof member 350.

Although a specific spring and linkage configuration is shown in FIGS. 15A to 16B, it is to be appreciated that various other configurations are contemplated as within the scope of the present disclosure. For example, a spring may be arranged around an exterior of a stem member to permit a wheel to translate vertically, while a travel stop member may be provided to limit upward travel of the hoof member. In certain embodiments, a travel stop member may resemble a partial skirt arranged around a portion of a perimeter of a collar and may be keyed to the stem member or collar, so that a travel stop may always be positioned above the hoof member regardless of rotational position relative to the z-axis. According to such an embodiment, a wheel of a caster assembly may be permitted to travel upward upon imposition of a downward force on the stem member, but a travel stop member associated with the hoof member may prevent or limit vertical travel of the hoof member, such that upon imposition of sufficient downward force on the stem member (and concomitant upward travel of the wheel), a bottom surface of the hoof member will contact a support surface on which the wheel is arranged. Still other configurations are possible and within the scope of the present disclosure.

In certain contexts, mobile delivery robots suitable for residential use and useful for carrying cargo may encounter various navigable conditions (e.g., transitions between different types of flooring, electrical cords, etc.) that may elevate a risk of shaking (e.g., dislodging) or spillage of cargo. This risk may be mitigated by using a method for facilitating autonomous navigation by a mobile robot of an unstructured residential environment, the method comprising: identifying a set of desired robot destinations within the unstructured residential environment, identifying paths between at least some desired robot destinations of the set of desired robot destinations; identifying one or more transit risk areas within the paths over which transit of the mobile robot at a first transit speed would cause an undue risk of shaking or spillage of cargo when borne by the mobile robot; mapping locations of the one or more transit risk areas; and responsive to determination that the mobile robot is in or proximate to a mapped location of the one or more transit risk areas, reducing transit speed of the mobile robot to at least one threshold speed below the first transit speed to reduce a risk of shaking or spillage of cargo when borne by the mobile robot. In certain embodiments, the foregoing mapping can be performed manually during initial setup of robot travel routes in a residential environment. In certain embodiments, the foregoing mapping may be performed by the mobile robot utilizing one or more sensors (e.g., one or more inertial measurement units) of the mobile, and be performed automatically as the mobile robot navigates along robot travel routs. In certain embodiments, a mobile robot can further apply machine learning techniques to determine how much the robot needs to slow down for each mapped area (e.g., one or more threshold speeds below the first transit speed) to minimize shaking or spillage or cargo below one or more acceptable thresholds. In certain embodiments, the automatic slowing of a mobile robot when present in one or more transit risk areas may be selectively deactivated (or reactivated) by a user when desired. If a mobile robot slows down too often, it can add a significant amount of time to navigating mobile robot transit routes and such slowing may not be desirable or necessary depending on how the cargo is affected by shaking.

In certain contexts, a mobile delivery robot may encounter one or more areas (e.g., extra plush carpets, carpets with extra soft padding, areas with area rugs placed over existing flooring, areas with variegated floor registers, or the like) that entail higher than normal user effort to move the robot by pushing. If a mobile robot should navigate into such an area and experience a loss of charge, a mobile robot not subject to being manually positioned with ease by a user could potentially block a path within a residential environment. This risk may be mitigated by using a method for facilitating autonomous navigation by a mobile robot of an unstructured residential environment, the method comprising: identifying a set of desired robot destinations within the unstructured residential environment; identifying paths between at least some desired robot destinations of the set of desired robot destinations; identifying one or more high transit effort areas within the paths over which manual pushing of the mobile robot would require a user to apply an amount of force exceeding a threshold force; mapping locations of the one or more high transit effort areas; and eliminating utilization by the mobile robot of paths including the one or more high transit effort areas in the absence of a user override of such utilization. In certain embodiments, the identifying of one or more high transit effort areas is performed by a user. In certain embodiments, the identifying of one or more high transit effort areas is performed by the mobile robot by detecting one or more signals indicative of motor torque and/or motor currents applied to differential drive wheels of the mobile robot. In certain embodiments, mobile robot transit routes may be disallowed entirely in one or more high transit effort areas. In certain embodiments, mobile robot transit routes may be conditionally allowed in one or more high transit effort areas, such as by alerting a user and eliciting approval so the user understands and accepts the added risk of operating the mobile robot along such areas.

Those of skill in the art will further appreciate that the various illustrative logical blocks, modules, circuits, and algorithms described in connection with the embodiments disclosed herein may be implemented as electronic hardware, instructions stored in memory or in another computer readable medium and executed by a processor or other processing device, or combinations of both. The components of the system described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer readable medium known in the art. A storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the embodiments may be combined. Those of skill in the art will also understand that information and signals may be represented using any of a variety of technologies and techniques. For example, data, instructions, commands, information, signals, bits, symbols, and chips, which may be referenced throughout the above description, may be represented by voltages, currents, electromagnetic waves, magnetic fields, particles, optical fields, or any combination thereof.

It will be apparent to those skilled in the art that various modifications and variations can be made to the present inventive technology without departing from the spirit and scope of the disclosure. Since modifications, combinations, sub-combinations and variations of the disclosed embodiments incorporating the spirit and substance of the inventive technology may occur to persons skilled in the art, the inventive technology should be construed to include everything within the scope of the appended claims and their equivalents.

The invention claimed is:

1. A mobile robot apparatus comprising:

a mobile base; and a plurality of caster assemblies arranged along lower peripheral areas of the mobile base, and coupled to the mobile base, wherein each caster assembly of the plurality of caster assemblies comprises:

a stem member configured to permit pivotal movement about a vertical axis;

a wheel having a horizontal axis of rotation that is laterally offset in a first direction relative to the vertical axis; and a hoof member comprising a body structure and defining a recess that is arranged below the stem member and that receives a portion of the wheel, wherein at least a portion of the hoof member is laterally offset relative to the vertical axis in a second direction that opposes the first direction, and wherein during rotation of the wheel, a bottom surface of the hoof member is elevated relative to a bottom of the wheel;

wherein the mobile robot apparatus further comprises a plurality of powered differential drive wheels configured to move the mobile base.

2. The mobile robot apparatus of claim 1, wherein for each caster assembly of the plurality of caster assemblies, the body structure of the hoof member comprises a generally arcuate shape when viewed from above.

3. The mobile robot apparatus of claim 1, wherein for each caster assembly of the plurality of caster assemblies, the body structure of the hoof member spans around at least 180 degrees of a perimeter of the stem member when viewed from above.

4. The mobile robot apparatus of claim 1, wherein for each caster assembly of the plurality of caster assemblies, a portion of the body assembly of the hoof member is laterally offset in the second direction from the vertical axis a greater distance than the horizontal axis of rotation is laterally offset in the first direction from the vertical axis.

5. The mobile robot apparatus of claim 1, wherein for each caster assembly of the plurality of caster assemblies, the hoof member is configured to pivot downward upon imposition of a downward vertical force on the stem member, to permit a portion of the hoof member to contact a travel surface on which the wheel is supported.

6. The mobile robot apparatus of claim 1, wherein each caster assembly of the plurality of caster assemblies further comprises a pivotal link member arranged between the hoof member and the wheel, wherein for each caster assembly, the pivotal link member is configured to permit the hoof member to pivot downward around the horizontal axis of the wheel.

7. The mobile robot apparatus of claim 1, wherein for each caster assembly, the hoof member is rigidly affixed to a support structure for the stem member to prevent downward pivotal movement of the hoof member.

8. A method for facilitating autonomous navigation by a mobile robot apparatus according to claim 1 of an unstructured residential environment, the method comprising:

identifying a set of desired robot destinations within the unstructured residential environment, identifying paths between at least some desired robot destinations of the set of desired robot destinations;

identifying one or more transit risk areas within the paths over which transit of the mobile robot apparatus at a first transit speed would cause an undue risk of shaking or spillage of cargo when borne by the mobile robot apparatus;

mapping locations of the one or more transit risk areas; and responsive to determination that the mobile robot apparatus is in or proximate to a mapped location of the one or more transit risk areas, reducing transit speed of the mobile robot apparatus to at least one threshold speed below the first transit speed to reduce a risk of shaking or spillage of cargo when borne by the mobile robot apparatus.

9. The mobile robot apparatus of claim 1, wherein:

the mobile base is substantially rectangular with four corner areas, the plurality of caster assemblies comprises four caster assemblies, and each caster assembly is arranged proximate to a respective corner area of the four corner areas; and the plurality of powered differential drive wheels are positioned distal from the four corner areas.

10. The mobile robot apparatus of claim 1, wherein a lower portion of the hoof member comprises an arcuate shape resembling a horseshoe.

11. The mobile robot apparatus of claim 6, wherein for each caster assembly, the pivotal link member is coupled with a spring configured to exert a restoring force to counteract downward pivotal movement of the hoof member.

12. The method of claim 8, wherein the identifying of one or more transit risk areas is performed by the mobile robot apparatus utilizing one or more sensors of the mobile robot apparatus.

13. The method of claim 8, further comprising selectively activating, by a user, whether transit speed of the mobile robot apparatus should be reduced to the at least one threshold speed below the first transit speed.

14. The method of claim 8, further comprising identifying, by a user, one or more high transit effort areas within the path over which manual pushing of the mobile robot apparatus would require a user to apply an amount of force exceeding a threshold force.

15. The method of claim 8, further comprising identifying one or more high transit effort areas within the path over which manual pushing of the mobile robot apparatus would require a user to apply an amount of force exceeding a threshold force, wherein the identifying of one or more high transit effort areas comprises detecting one or more signals indicative of motor torque and/or motor currents applied to differential drive wheels of the mobile robot apparatus.

16. The mobile robot apparatus of claim 10, wherein the hoof member comprises a bottom surface that includes a transition region along edges thereof that curves upward toward a peripheral edge of the hoof member, wherein the bottom surface comprises a substantially central recess.

17. The mobile robot apparatus of claim 11, wherein each caster assembly further comprises a drag link member that is pivotally coupled with and arranged to pivot relative to the hoof member, wherein an upper portion of the drag link member is configured to slide relative to a slot defined in a slot-forming member coupled with a support structure for the stem member.

18. The mobile robot apparatus of claim 17, wherein for each caster assembly, a lower portion of the drag link member extends through a cavity defined in the body structure to protrude downward below a lower surface of the hoof member.

19. The mobile robot apparatus of claim 18, wherein each caster assembly further comprises a bend or directional change between the upper portion of the drag link member and the lower portion of the drag link member.

20. The mobile robot apparatus of claim 19, wherein each caster assembly is configured to cause the lower portion of the drag link and a portion of the hoof member to be in simultaneous contact with the travel surface responsive to imposition of a downward vertical force on the stem member.

* * * * *